(12) United States Patent
Intwala et al.

(10) Patent No.: US 8,611,693 B2
(45) Date of Patent: *Dec. 17, 2013

(54) MANAGING ARTIFACTS IN FREQUENCY DOMAIN PROCESSING OF LIGHT-FIELD IMAGES

(75) Inventors: Chintan Intwala, Santa Clara, CA (US); Todor G. Georgiev, Sunnyvale, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/434,189

(22) Filed: Mar. 29, 2012

(65) Prior Publication Data

US 2013/0121615 A1    May 16, 2013

Related U.S. Application Data

(63) Continuation of application No. 12/130,725, filed on May 30, 2008, now Pat. No. 8,244,058.

(51) Int. Cl.
*G06K 9/36* (2006.01)
(52) U.S. Cl.
USPC .......................... 382/280; 382/254
(58) Field of Classification Search
USPC ............................. 382/254, 280
See application file for complete search history.

(56) References Cited

U.S. PATENT DOCUMENTS

| | | |
|---|---|---|
| 725,567 A | 4/1903 | Ives |
| 2,039,648 A | 5/1936 | Ives |
| 3,743,379 A | 7/1973 | McMahon |
| 3,971,065 A | 7/1976 | Bayer |
| 3,985,419 A | 10/1976 | Matsumoto et al. |
| 4,175,844 A | 11/1979 | Glaser-Inbari |
| 4,180,313 A | 12/1979 | Inuiya |
| 4,193,093 A | 3/1980 | St. Clair |
| 4,230,942 A | 10/1980 | Stauffer |
| 4,580,219 A | 4/1986 | Pelc et al. |
| 4,732,453 A | 3/1988 | De Montebello et al. |
| 4,849,782 A | 7/1989 | Koyama et al. |

(Continued)

FOREIGN PATENT DOCUMENTS

| | | |
|---|---|---|
| CN | 101588437 | 11/2009 |
| CN | 101610353 | 12/2009 |

(Continued)

OTHER PUBLICATIONS

European Search Report, EP Application No. 09159086.9, (Aug. 14, 2009), 8 pages.

(Continued)

*Primary Examiner* — Jingge Wu
(74) *Attorney, Agent, or Firm* — Wolfe-SBMC

(57) ABSTRACT

Various methods and apparatus for removing artifacts in frequency domain processing of light-field images are described. Methods for the reduction or removal of the artifacts are described that include methods that may be applied during frequency domain processing and a method that may be applied during post-processing of resultant angular views. The methods may be implemented in software as or in a light-field frequency domain processing module. The described methods include an oversampling method to determine the correct centers of slices, a phase multiplication method to determine the correct centers of slices, a method to exclude low-energy slices, and a cosmetic correction method.

20 Claims, 13 Drawing Sheets

(56) References Cited

U.S. PATENT DOCUMENTS

| | | | |
|---|---|---|---|
| 5,076,687 A | 12/1991 | Adelson | |
| 5,125,750 A | 6/1992 | Corle et al. | |
| 5,361,127 A | 11/1994 | Daily | |
| 5,400,093 A | 3/1995 | Timmers | |
| 5,579,445 A | 11/1996 | Loce et al. | |
| 5,659,420 A | 8/1997 | Wakai et al. | |
| 5,724,122 A | 3/1998 | Oskotsky | |
| 5,729,011 A | 3/1998 | Sekiguchi | |
| 5,946,077 A | 8/1999 | Nemirovskiy | |
| 5,987,164 A | 11/1999 | Szeliski et al. | |
| 6,009,188 A | 12/1999 | Cohen et al. | |
| 6,097,394 A | 8/2000 | Levoy et al. | |
| 6,097,541 A | 8/2000 | Davies et al. | |
| 6,137,535 A | 10/2000 | Meyers | |
| 6,137,937 A | 10/2000 | Okano et al. | |
| 6,268,846 B1 | 7/2001 | Georgiev | |
| 6,301,416 B1 | 10/2001 | Okano et al. | |
| 6,317,192 B1 | 11/2001 | Silverbrook et al. | |
| 6,339,506 B1 | 1/2002 | Wakelin et al. | |
| 6,341,183 B1 | 1/2002 | Goldberg | |
| 6,351,269 B1 | 2/2002 | Georgiev | |
| 6,476,805 B1 | 11/2002 | Shum et al. | |
| 6,570,613 B1 | 5/2003 | Howell | |
| 6,738,533 B1 | 5/2004 | Shum et al. | |
| 6,804,062 B2 | 10/2004 | Atwater et al. | |
| 6,831,782 B2 | 12/2004 | Patton et al. | |
| 6,838,650 B1 | 1/2005 | Toh | |
| 6,842,297 B2* | 1/2005 | Dowski, Jr. | 359/724 |
| 6,961,075 B2 | 11/2005 | Mindler et al. | |
| 7,019,671 B2 | 3/2006 | Kawai | |
| 7,054,067 B2 | 5/2006 | Okano et al. | |
| 7,085,062 B2 | 8/2006 | Hauschild | |
| 7,113,231 B2 | 9/2006 | Conner et al. | |
| 7,119,319 B2* | 10/2006 | Noto et al. | 250/208.1 |
| 7,164,446 B2* | 1/2007 | Konishi | 348/349 |
| 7,167,203 B1* | 1/2007 | Yukawa et al. | 348/357 |
| 7,367,537 B2* | 5/2008 | Ibe | 248/266 |
| 7,470,032 B2 | 12/2008 | Damera-Venkata et al. | |
| 7,620,309 B2 | 11/2009 | Georgiev | |
| 7,723,662 B2 | 5/2010 | Levoy et al. | |
| 7,732,744 B2 | 6/2010 | Utagawa | |
| 7,792,423 B2 | 9/2010 | Raskar et al. | |
| 7,838,814 B2 | 11/2010 | Minhas et al. | |
| 7,872,796 B2 | 1/2011 | Georgiev | |
| 7,880,794 B2 | 2/2011 | Yamagata et al. | |
| 7,936,392 B2 | 5/2011 | Ng et al. | |
| 7,949,252 B1 | 5/2011 | Georgiev | |
| 7,956,924 B2 | 6/2011 | Georgiev | |
| 7,962,033 B2 | 6/2011 | Georgiev et al. | |
| 7,965,936 B2 | 6/2011 | Raskar et al. | |
| 7,978,234 B2 | 7/2011 | Yano et al. | |
| 8,019,215 B2 | 9/2011 | Georgiev et al. | |
| 8,126,323 B2 | 2/2012 | Georgiev et al. | |
| 8,155,456 B2 | 4/2012 | Babacan et al. | |
| 8,160,439 B2 | 4/2012 | Georgiev et al. | |
| 8,189,065 B2 | 5/2012 | Georgiev et al. | |
| 8,189,089 B1 | 5/2012 | Georgiev | |
| 8,228,417 B1 | 7/2012 | Georgiev et al. | |
| 8,243,157 B2 | 8/2012 | Ng et al. | |
| 8,290,358 B1 | 10/2012 | Georgiev | |
| 8,315,476 B1 | 11/2012 | Georgiev et al. | |
| 8,345,144 B1 | 1/2013 | Georgiev et al. | |
| 8,379,105 B2 | 2/2013 | Georgiev et al. | |
| 8,380,060 B2 | 2/2013 | Georgiev et al. | |
| 8,400,555 B1 | 3/2013 | Georgiev et al. | |
| 8,401,316 B2 | 3/2013 | Babacan | |
| 8,559,756 B2 | 10/2013 | Georgiev et al. | |
| 2001/0012149 A1 | 8/2001 | Lin et al. | |
| 2001/0050813 A1 | 12/2001 | Allio | |
| 2002/0140835 A1 | 10/2002 | Silverstein | |
| 2002/0159030 A1* | 10/2002 | Frey et al. | 351/212 |
| 2003/0108821 A1 | 6/2003 | Mei et al. | |
| 2003/0117511 A1* | 6/2003 | Belz et al. | 348/333.11 |
| 2003/0156077 A1* | 8/2003 | Balogh | 345/6 |
| 2003/0231255 A1 | 12/2003 | Szajewski et al. | |
| 2004/0114807 A1 | 6/2004 | Lelescu et al. | |
| 2004/0218830 A1 | 11/2004 | Kang et al. | |
| 2004/0223214 A1 | 11/2004 | Atkinson | |
| 2005/0080602 A1* | 4/2005 | Snyder et al. | 703/2 |
| 2005/0088714 A1 | 4/2005 | Kremen | |
| 2005/0099504 A1 | 5/2005 | Nayar et al. | |
| 2005/0122418 A1 | 6/2005 | Okita et al. | |
| 2005/0243178 A1 | 11/2005 | McConica | |
| 2006/0061845 A1 | 3/2006 | Lin | |
| 2006/0072029 A1* | 4/2006 | Miyatake et al. | 348/340 |
| 2006/0104542 A1 | 5/2006 | Blake et al. | |
| 2006/0109282 A1 | 5/2006 | Lin et al. | |
| 2006/0177150 A1 | 8/2006 | Uyttendaele et al. | |
| 2007/0091197 A1 | 4/2007 | Okayama et al. | |
| 2007/0252074 A1 | 11/2007 | Ng et al. | |
| 2007/0258096 A1 | 11/2007 | Cui et al. | |
| 2007/0285526 A1 | 12/2007 | Mann et al. | |
| 2008/0007839 A1 | 1/2008 | Deng et al. | |
| 2008/0056549 A1 | 3/2008 | Hamill et al. | |
| 2008/0095469 A1 | 4/2008 | Kiser | |
| 2008/0107231 A1 | 5/2008 | Miyazaki et al. | |
| 2008/0142685 A1 | 6/2008 | Gazeley | |
| 2008/0152215 A1 | 6/2008 | Horie et al. | |
| 2008/0165270 A1 | 7/2008 | Watanabe et al. | |
| 2008/0166063 A1 | 7/2008 | Zeng | |
| 2008/0187305 A1 | 8/2008 | Raskar et al. | |
| 2008/0193026 A1 | 8/2008 | Horie et al. | |
| 2008/0218610 A1 | 9/2008 | Chapman et al. | |
| 2008/0247623 A1 | 10/2008 | Delso et al. | |
| 2009/0002504 A1 | 1/2009 | Yano et al. | |
| 2009/0027542 A1 | 1/2009 | Yamamoto et al. | |
| 2009/0041381 A1 | 2/2009 | Georgiev et al. | |
| 2009/0041448 A1 | 2/2009 | Georgiev | |
| 2009/0086304 A1 | 4/2009 | Yurlov et al. | |
| 2009/0122175 A1 | 5/2009 | Yamagata | |
| 2009/0127440 A1 | 5/2009 | Nakai | |
| 2009/0128658 A1 | 5/2009 | Hayasaka et al. | |
| 2009/0128669 A1* | 5/2009 | Ng et al. | 348/241 |
| 2009/0140131 A1 | 6/2009 | Utagawa et al. | |
| 2009/0167922 A1 | 7/2009 | Perlman et al. | |
| 2009/0179142 A1 | 7/2009 | Duparre et al. | |
| 2009/0185801 A1 | 7/2009 | Georgiev et al. | |
| 2009/0190022 A1 | 7/2009 | Ichimura | |
| 2009/0268970 A1 | 10/2009 | Babacan et al. | |
| 2009/0295829 A1 | 12/2009 | Georgiev et al. | |
| 2009/0316014 A1 | 12/2009 | Lim et al. | |
| 2010/0013979 A1 | 1/2010 | Golub et al. | |
| 2010/0026852 A1 | 2/2010 | Ng et al. | |
| 2010/0085468 A1 | 4/2010 | Park et al. | |
| 2010/0091133 A1 | 4/2010 | Lim et al. | |
| 2010/0097491 A1 | 4/2010 | Farina et al. | |
| 2010/0128145 A1 | 5/2010 | Pitts et al. | |
| 2010/0141802 A1 | 6/2010 | Knight et al. | |
| 2010/0205388 A1 | 8/2010 | MacInnis | |
| 2010/0265381 A1 | 10/2010 | Yamamoto et al. | |
| 2010/0265386 A1 | 10/2010 | Raskar et al. | |
| 2011/0043604 A1 | 2/2011 | Peleg et al. | |
| 2011/0063354 A1 | 3/2011 | Enge | |
| 2011/0141224 A1 | 6/2011 | Stec et al. | |
| 2011/0169980 A1 | 7/2011 | Cho et al. | |
| 2011/0211824 A1 | 9/2011 | Georgiev et al. | |
| 2012/0183232 A1 | 7/2012 | Babacan et al. | |
| 2012/0229679 A1 | 9/2012 | Georgiev et al. | |
| 2012/0281072 A1 | 11/2012 | Georgiev et al. | |
| 2013/0120356 A1 | 5/2013 | Georgiev | |
| 2013/0120605 A1 | 5/2013 | Georgiev | |
| 2013/0127901 A1 | 5/2013 | Georgiev et al. | |
| 2013/0128030 A1 | 5/2013 | Georgiev | |
| 2013/0128068 A1 | 5/2013 | Georgiev et al. | |
| 2013/0128069 A1 | 5/2013 | Georgiev et al. | |
| 2013/0128077 A1 | 5/2013 | Georgiev | |
| 2013/0128081 A1 | 5/2013 | Georgiev | |
| 2013/0128087 A1 | 5/2013 | Georgiev et al. | |

FOREIGN PATENT DOCUMENTS

| | | |
|---|---|---|
| CN | 807604 | 7/2011 |
| EP | 1548481 | 6/2005 |
| JP | 504669 | 10/1976 |

(56) References Cited

FOREIGN PATENT DOCUMENTS

| | | |
|---|---|---|
| JP | 7270791 | 10/1995 |
| JP | 2001330769 | 11/2001 |
| JP | 2004239932 | 8/2004 |
| WO | 01/37025 | 5/2001 |
| WO | WO-0137025 | 5/2001 |
| WO | 2006/057838 | 1/2006 |
| WO | WO-2006057838 | 6/2006 |
| WO | WO-2007044725 | 4/2007 |
| WO | 2007115281 | 10/2007 |
| WO | WO-2007115281 | 10/2007 |
| WO | WO-2009151903 | 12/2009 |

OTHER PUBLICATIONS

Final Office Action, U.S. Appl. No. 13/425,306, (Sep. 19, 2012), 7 pages.
Final Office Action , U.S. Appl. No. 12/130,725, (Jan. 3, 2012), 6 pages.
Final Office Action, U.S. Appl. No. 12/957,312, (Jun. 6, 2013), 16 pages.
Non-Final Office Action, U.S. Appl. No. 12/957,316, (Mar. 22, 2013), 16 pages.
Non-Final Office Action, U.S. Appl. No. 12/111,735, (Jul. 28, 2011), 12 pages.
Non-Final Office Action, U.S. Appl. No. 12/130,725, (Sep. 9, 2011), 7 pages.
Non-Final Office Action, U.S. Appl. No. 12/186,392, (Apr. 3, 2012), 13 pages.
Non-Final Office Action, U.S. Appl. No. 12/186,392, (Nov. 19, 2012), 13 pages.
Non-Final Office Action, U.S. Appl. No. 12/271,389, (Sep. 30, 2010), 7 pages.
Non-Final Office Action, U.S. Appl. No. 12/474,112, (Oct. 19, 2011), 5 pages.
Non-Final Office Action, U.S. Appl. No. 12/628,437, (Jul. 30, 2012), 10 pages.
Non-Final Office Action, U.S. Appl. No. 12/690,869, (Mar. 26, 2012), 8 pages.
Non-Final Office Action, U.S. Appl. No. 12/957,312, (Nov. 13, 2012), 14 pages.
Non-Final Office Action, U.S. Appl. No. 12/957,320, (Dec. 5, 2012), 11 pages.
Non-Final Office Action, U.S. Appl. No. 12/957,322, (Apr. 24, 2013), 15 pages.
Non-Final Office Action, U.S. Appl. No. 13/103,880, (Aug. 9, 2011), 5 pages.
Non-Final Office Action, U.S. Appl. No. 13/425,306, (May 31, 2012), 7 pages.
Non-Final Office Action, U.S. Appl. No. 13/476,638, (Jul. 6, 2012), 6 pages.
"Notice of Allowance", U.S. Appl. No. 12/917,984, (Aug. 21, 2012), 11 pages.
"Notice of Allowance", U.S. Appl. No. 12/111,735, (Dec. 14, 2011), 10 pages.
"Notice of Allowance", U.S. Appl. No. 12/130,725, (Apr. 3, 2012), 8 pages.
"Notice of Allowance", U.S. Appl. No. 12/186,392, (Mar. 13, 2013), 8 pages.
"Notice of Allowance", U.S. Appl. No. 12/271,389, (Feb. 2, 2011), 4 pages.
"Notice of Allowance", U.S. Appl. No. 12/271,389, (Jun. 18, 2010),
"Notice of Allowance", U.S. Appl. No. 12/474,112, (Jan. 30, 2012), 5 pages.
"Notice of Allowance", U.S. Appl. No. 12/503,803, (Mar. 20, 2012), 6 pages.
"Notice of Allowance", U.S. Appl. No. 12/628,437, (Dec. 18, 2012), 6 pages.
"Notice of Allowance", U.S. Appl. No. 12/690,869, (Jul. 13, 2012), 7 pages.
"Notice of Allowance", U.S. Appl. No. 13/103,880, (Dec. 13, 2011), 5 pages.
"Notice of Allowance", U.S. Appl. No. 13/425,306, (Dec. 10, 2012), 4 pages.
"Notice of Allowance", U.S. Appl. No. 13/429,226, (Dec. 26, 2012), 7 pages.
"Notice of Allowance", U.S. Appl. No. 13/476,638, (Oct. 29, 2012), 4 pages.
"Notice of Allowance", U.S. Appl. No. 13/549,330, (Feb. 7, 2013), 9 pages.
"PyOpenGL 3.x The Python OpenGL Binding", Retrieved from <http://pyopengl.sourceforge.net> on Dec. 21, 2010, 2 pages.
"Restriction Requirement", U.S. Appl. No. 12/111,735, (Apr. 29, 2011), 6 pages.
"Restriction Requirement", U.S. Appl. No. 12/130,725, (Jul. 15, 2011), 5 pages.
"Restriction Requirement", U.S. Appl. No. 12/474,112, (Jul. 28, 2011), 6 pages.
"Restriction Requirement", U.S. Appl. No. 12/957,316, (Jan. 23, 2013), 6 pages.
"Supplemental Notice Allowance", U.S. Appl. No. 12/271,389, (Feb. 10, 2011), 2 pages.
"Supplemental Notice of Allowance", U.S. Appl. No. 12/474,112, (Mar. 8, 2012), 2 pages.
"Supplemental Notice of Allowance", U.S. Appl. No. 12/503,803, (Apr. 23, 2012), 13 pages.
"Supplemental Notice of Allowance", U.S. Appl. No. 13/103,880, (Jan. 20, 2012), 2 pages.
U.S. Appl. No. 11/627,141, filed Jan. 25, 2007, 43 pages.
U.S. Appl. No. 11/874,611, filed Oct. 18, 2007, 43 pages.
U.S. Appl. No. 12/111,735, filed Apr. 29, 2008, 44 pages.
U.S. Appl. No. 12/186,396, filed Aug. 5, 2008, 69 pages.
U.S. Appl. No. 12/271,389, filed Nov. 14, 2008, 63 pages.
U.S. Appl. No. 12/474,112, filed May 28, 2009, 75 pages.
U.S. Appl. No. 12/636,168, filed Dec. 11, 2009, 60 pages.
U.S. Appl. No. 12/690,569, filed Jan. 20, 2010, 36 pages.
U.S. Appl. No. 12/690,871, filed Jan. 20, 2010, 105 pages.
U.S. Appl. No. 12/917,984, filed Nov. 2, 2010, 127 pages.
U.S. Appl. No. 12/957,308, filed Nov. 30, 2010, 73 pages.
U.S. Appl. No. 12/957,312, filed Nov. 30, 2010, 91 pages.
U.S. Appl. No. 12/957,316, filed Oct. 30, 2010, 66 pages.
U.S. Appl. No. 12/957,320, filed Nov. 30, 2010, 58 pages.
U.S. Appl. No. 12/957,322, filed Nov. 30, 2010, 53 pages.
U.S. Appl. No. 12/957,326, filed Nov. 30, 2010, 73 pages.
U.S. Appl. No. 13/288,759, filed Nov. 3, 2011, 54 pages.
U.S. Appl. No. 13/288,765, filed Nov. 3, 2011, 50 pages.
U.S. Appl. No. 13/429,765, filed Mar. 23, 2012, 44 pages.
U.S. Appl. No. 13/429,226, filed Mar. 23, 2012, 44 pages.
Adelson, et al., "Single lens stereo with a plenoptic camera", *IEEE Transactions on Patter Analysis D and Machine Intelligence*, val. 14, issue 2, 99-106, 1992,pp. 99-106.
Adelson, et al., "The Plenoptic Function and the Elements of Early Vision", *Computational models of visual processing (Mit Press)*, (1991), 18 pages.
Aggarwal, Manoj et al., "Split Aperture Imaging for High Dynamic Range", *International Journal of Computer Vision*, (Jan. 2004), 8 pages.
Aliaga, et al., "Plenoptic Stitching: A Scalable Method of Reconstructing 30 Interactive Walkthroughs", *Proceedings of the 28th annual conference on Computer graphics and interactive techniques*, (Aug. 2001), pp. 443-450.
Baker, et al., "Limits on Superresolution and How to Break Them", *IEEE Transactions on Pattern Analysis and Machine Intelligence*, (Jan. 2002), 37 pages.
Bishop, et al., "Light Field Superresolution", *In International Conference on Computational Photography* (Apr. 6-17, 2009), (Apr. 16, 2009), 9 pages.
Borman, et al., "Super-resolution from image sequences—a review", *Proceedings of the 1998 D Midwest Symposium on Circuits and Systems*, Publication Date: Aug. 9-12, 1998, on pp. 374-378, (Aug. 9, 1998), 5 pages.

(56) References Cited

OTHER PUBLICATIONS

Brown, et al., "Unsupervised 3D Object Recognition and Reconstruction in Unordered Datasets", *In Proceedings of 5th International Conference on 3D Imaging and Modelling* (301M), (2005), 8 pages.

Capel, et al., "Computer Vision Applied to Super-resolution", *IEEE Signal Processing Magazine*, vol. 20 (Jan. 2003), 10 pages.

Chai, et al., "Plenoptic Sampling", *ACM Transactions Graphics*, (2000), 12 pages.

Chang, et al., "Light Field Compression Using Disparity-Compensated Lifting and Shape Adaptation", *IEEE Transactions on Image Processing*, vol. 15, No. 4,, (Apr. 2006), pp. 793-806.

Christensen, et al., "PANOPTES: A thin agile multi-resolution imaging sensor", *Microcuircuit Applications and Critical, Technology Conference (GOMACTech-05)*, (Jan. 2005), 4 Pages.

Debevec, Paul E., et al., "Recovering High Dynamic Range Radiance Maps from Photographs", *ACM Transaction on Graphics, SIGGRAPH 1997 Conference Proceedings*, San Diego, CA, (1997), 10 pages.

Dudley, Dana et al., "Emerging Digital Micromirror Device (DMD) Applications", *DLPTM Products New Applications, Texas Instruments, Inc., Copyright 2003 Society of Photo-Optical Instrumentation Engineers.*, This paper was published in SPIE Proceedings vol. 4985 (2003), 12 pages.

Durand, et al., "A Frequency Analysis of Light Transport", *ACM Transactions Graphics*, (2005), 12 pages.

Durang, Fredo "Fast Bilateral filtering for the Display of High-Dynamic-Range Images", *ACM Transactions on Graphics (TOG), Proceedings of the 26th Annual Conference on Computer Graphics and Interactive Techniques SIGGRAPH-02*, vol. 21, Issue 3, (2002), 10 pages.

Elad, et al., "Restoration of a single superresolution image from several blurred, noisy, and undersampled measured images", *IEEE Transactions on Image Processing* Dec. 1997, pp. 1646-1658.

Farsiu, et al., "Advances and challenges in super-resolution", *International Journal of Imaging Systems and Technology*, 2004., pp. 47-57.

Fecker, Ulrich et al., "Transposed Picture Ordering for Dynamic Light Field Coding", *Joint Video Team (JVT) of ISO/IEC MPEG & ITU-T VGEG* (ISO/IEC JTC1/SC29/WG11 and ITU-T SG16 06), (Jul. 9, 2004), 8 pages.

Ferrand, et al., "Direct imaging of photonic nanojets", *Optics Express* vol. 16, No. 10, (May 12, 2008), pp. 6930-6940.

Fife, Keith et al., "A 3Mpixel Multi-Aperture Image Sensor With 0.7um Pixels in 0.11um CMOS", *IEEE ISSCC Digest of Technical Papers* (Feb. 2008), pp. 48-49, available at <http://isl.stanford.edu/groups/elgamal/people/kfife/>,(Feb. 2008), 3 pages.

Georgiev, U.S. Appl. No. 12/144,411, filed Jun. 23, 2008, 63 pages.

Georgiev, U.S. Appl. No. 12/574,183, filed Oct. 6, 2009, 30 pages.

Georgiev, U.S. Appl. No. 12/790,677, filed May 28, 2010, 48 pages.

Georgiev, et al., "Depth of Field in Plenoptic Cameras", *In Euorgraphics 2009-Annex*, (Apr. 2009), 4 pages.

Georgiev, et al., "Light Field Camera Design for Integral View Photography", *Adobe Systems Technical Report*, (2006), 13 pages.

Georgiev, et al., "Light-Field Capture by Multiplexing in the Frequency Domain", *ADOBE Technical Report*, (Apr. 2007), 14 pages.

Georgiev, et al., "Morphing Between Multiple Images", *Southern Illinois Universtiy at Carbondale, Dept. of Computer Science, Technical Report*, (Apr. 17, 1997), 17 pages.

Georgiev, et al., "Spatio-angular resolution tradeoff in integral photography", *Proc. Eurographics Symposium on Rendering*, 2006, (2006), 10 pages.

Georgiev, et al., U.S. Appl. No. 12/690,869, filed Jan. 20, 2010, 103 pages.

Georgiev, et al., U.S. Appl. No. 12/503,803, filed Jul. 15, 2009, 114 pages.

Georgiev, et al., U.S. Appl. No. 12/628,437, filed Dec. 1, 2009, 114 pages.

Gortler, et al., "The Lumigraph", *ACM Trans. Graph.*, 43-54, 1996, pp. 43-54.

Grzeszczuk, et al., "Standard Support for Progressive Encoding, Compression and Interactive Visualization of Surface Light Fields", *Joint Video Tern (JVT) of ISO/IEC MPEG & ITU-TVGEG* (ISO/IEC JTC1/SC29/WG11 and ITU-T SG16 06), (Nov. 21, 2001), 11 pages.

Guttosch, Rudolph J., "Investigation of Color Aliasing of High Spatial Frequencies and Edges for Bayer-Pattern Sensors and Foveon X3 Direct Image Sensors", *Tech. Rep., Foveon*, 2002, 8 pages.

Horstmeyer, R et al., "Flexible multimodal camera using a light field architecture.", *In Proceedings ICCP 2009*, 2009., pp. 1-8.

Horstmeyer, Roarke et al., "Modified light field architecture for reconfigurable multimode imaging", *In Adaptive Coded Aperture Imaging, Non-Imaging, and Unconventional Imaging Sensor Systems. SPIE*, 2009., 9 pages.

Horstmeyer, Roarke et al., "Pupil plane multiplexing for multi-domain imaging in sensors.", *In Society of Photo-Optical Instrumentation Engineers (SPIE) Conference Series*, vol. D 7906, Aug. 2008., 10 pages Hubel, Paul M., "Foveon Technology and the Changing Landscape of Digital Cameras", *Thirteenth Color Imaging Conference: Color Science and Engineering Systems, Technoloies, and Applications*, Scottsdale, Arizona (Nov. 2005), pp. 314-317.

Hubel, Paul M., et al., "Spatial Frequency Response of Color Image Sensors: Bayer Color Filters and Foveon X3", *Proceedings of the SPIE*, vol. 5301, (2004), pp. 1-4.

Hunt, B. R., "Super-Resolution of Images: Algorithms, Principles, Performance", *International Journal of Imaging Systems and Technology*, vol. 6, (Jan. 1995), 9 pages.

Intwala, et al., U.S. Appl. No. 12/130,725, filed May 30, 2008, 52 pages.

Isaksen, Aaron "Dynamically Reparameterized Light Fields", *Submitted to the Department of Electrical Engineering and Computer Science in partial fulfillment of the requirements for the degree of Master of Science in Electrical Engineering and Computer Science at the Massachusetts Institute of Technology*, (Nov. 2000), 79 pages.

Isaksen, et al., "Dynamically reparameterized light fields", *ACM Trans. Graph.*, 297-306, 2000, pp. 297-306.

Kessenich, et al., "The OpenGL Shading Language", *Version: 4.00, Document Revision: 7*, (Feb. 12, 2010), 160 pages.

Lee, et al., "Polymorph: Morphing Among Multiple Images", *IEEE Computer Graphics and Application*, (1998), pp. 60-73.

Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.

Levoy, et al., "Light Field Rendering", *ACM Trans. Graph.*, 31-42, 1996, pp. 31-42.

Levoy, et al., "Recording and Controlling the 4D Light Field in a Microscope Using Microlens Arrays", *Journal of Microscopy*, vol. 235, Pt 2, (Apr. 7, 2009), 19 pages.

Levoy, Marc "Light Fields and Computational Imanging", *Computer* [Online], vol. 39, No. 8, XP002501300, (Aug. 2006), pp. 46-55.

Levoy, Mark et al., "Light Field Microscopy", *ACM Transactions on Graphic 25(3), Proceedings of SIGGRAPPH*, (2006), 11 pages.

Levoy, Mary "Optical Recipes for Light Microscopes", *Stanford Computer Grpahics Laboratory Technical Memo 2006-001*, (Jun. 20, 2006),5 pages.

Lin, Zhouchen "Fundamental Limits of Recontstruction-Based Supperresolution Algorithms under Local Translation", *IEEE Transactions on Pattern Analysis and Machine Intelligence 26*, 1 (Jan. 2004), 83-97, available at <http://research.microsoft.com/apps/pubs/default.aspx?id=69073>, (Jan. 2004) ,pp. 83-97.

Lippmann, "Epreuves Reversible Donnant la Sensation Du Relief ("Reversible Prints Providing the Sensation of Depth")", *Journal of Physics 7*, (1908), pp. 821-825.

Lippmann, "Reversible Prints", *Academie des sciences*, (Mar. 1908), 3 pages.

Lippmann, M.G. "Epreuves Reversibles Photographies Integrales ("Reversible Prints. Integral Photographs.")", *Academie des sciences*, Translation,(Mar. 1908), 4 Pages.

Lumsdaine, Andrew et al., "Full Resolution Lightfield Rendering", *Adobe Systems Technical Report*, (Jan. 2008), 12 pages.

(56) References Cited

OTHER PUBLICATIONS

Lumsdaine, et al., "The Focused Plenoptic Camera", *In International Conference on Computational Photography*, (Apr. 2009), 8 pages.
Lyon, Richard F., et al., "Eyeing the Camera: into the Next Century"*In Proceedings IS&T/SID 10th Color Imaging Conference*, (2002), 7 pages.
Meng, et al., "An Approach on Hardware Design for Computational Photography Applications based on Light Field Refocusing Algorithm", *Technical Reports CS-2007-15*, University of Virginia, (Nov. 18, 2007), pp. 1-12.
Naemura, et al., "3D Computer Graphics Based on Integral Photography", *Optics Express*, vol. 8, 2, (2001), 8 pages.
Narasimhan, Srinivasa G., et al., "Enhancing resolution along multiple imaging dimensions using assorted pixels,", *IEEE Trans. Pattern Anal. Mach. Intel I.*, 27(4 ), (Apr. 2005), pp. 518-530.
Nayar, et al., "High Dynamic Range Imaging: Spatially Varying Pixel Exposures", *IEEE Conference on Computer Vision and Pattern Recognition*, Jun. 2000, vol. 1, pp. 472-479., (Jun. 2000), 8 pages.
Nayar, Shree N., et al., "Programmable Imaging using a Digital Micromirror Array", *In Conf. on Computer Vision and Pattern Recognition*, pp. 1: 436-443, 2004, 8 pages.
Neumann, et al., "Eyes from Eyes Analysis of Camera Design Using Plenoptic Video Geometry", XP002509893, (Dec. 2001), 20 pages.
Ng, "Digital Light Field Photography", *A Dissertation Submitted to the Dept. of Computer Science and the Committee on Graduate Studies of Stanford Univ in Partial fulfillment of the requirements for the degree of Doctor of Philosophy*, 203, (Jul. 2006), 203 pages.
Ng, "Fourier slice photography", *International Conference on Computer Graphics and Interactive Techniques Proceedings of ACM SIGGRAPH 2005.*,10 pages.
Ng. et al., "Light field photography with a hand-held plenoptic camera", *Stanford University Computer Science Tech Report CSTR 2005-02*, Apr. 2005, 11 pages.
Ng, et al., "Mathematical Analysis of Super-Resolution Methodology", *Signal Processing Magazine*, IEEE 20, 3 (2003), pp. 62-74.
Nickolls, et al., "Scalable Parallel Programming with CUDA", *Queue 6*, 40-53, (Mar. 2008), 14 pages.
Park, Cheol S., et al., "Super-Resolution Image Reconstruction: A Technical Overview", *IEEE Signal Processing Magazine*, vol. 20, Issue 3, (May 2003), 16 pages.
Park, Jong H., et al., "An Ultra Wide Dynamic Range CMOS Image Sensor with a Linear Response", *Proceedings SPIE-IS&T Electronic Imaging*, SPIE vol. 6068, 2006., 8 pages.
Roberts, David E., "History of Lenticular and Related Autostereoscopic Methods", available at <ftp://ftp.umiacs.umd.edu/pub/aagrawal/HistoryOfIntegralImaging/HistoryOfLenticular.pdf>, (2003), 17 pages.
Schechner, Yoav Y., et al., "Generalized mosaicing", *In ICCV*, pp. 17-25, 2001., 8 pages.
Schechner, Yoav Y., et al., "Generalized Mosaicing: High Dynamic Range in a Wide Field of View", *International Journal of Computer Vision*, 53(3):245-267, (2003), 23 pages.
Schechner, Yoav Y., et al., "Generalized mosaicing: Polarization panorama", *IEEE Trans. Pattern Anal. Mach. Intell.*, 27(4):631-636, 2005, pp. 631-636.
Schechner, Yoaz et al., "Generalized mosaicing: Wide field of view multispectral imaging", *IEEE Trans. Pattern Anal. Mach. Intell.*, 24(1 0):1334-1348, 2002., (Oct. 2002), pp. 1334-1348.
Schultz, Richard R., "Super-Resolution Enhancement of Native Digital Video Versus Digitized NTSC Sequences", *In Proceedings of the Fifth IEEE Southwest Symposium on Image Analysis and Interpretation*, (2002), 5 pages.
Sebe, et al., "Multi-View Geometry Estimation for Light Field Compression", *VMV 2002*, (2002), 8 pages.
Segal, et al., "The OpenGL Graphics System: A Specification", *Version 3.2 (Core Profile)*, (Dec. 7, 2009), 404 pages.
Seitz, et al., "View Morphing", *ACM Transactions Graphics*, (1996), 10 pages.
Shing-Chow, et al., "The Compression of Simplified Dynamic Light Fields", *Proceedings of International Conference on Acoustics, Speech and Signal Processing*, Apr. 6-10, 2003, Hong Kong, val. 3, (Apr. 6, 2003), 4 pages.
Shum, Heung-Yeung et al., "Survey of Image-Based Representations and Compression Techniques", *IEEE Transactions on Circuits and Systems for Video Technology*, IEEE Service Center, vol. 13, No. 11, (Nov. 1, 2003), 18 pages.
Sloan, et al., "Time Critical Lumigraph Rendering", *Proceedings of the 1997 symposium on Interactive 3D graphics*, (Jan. 1997), 7 pages.
Stevens, et al., "Lens Arrays for a Three-dimensional Imaging System", *Journal of Optics A: Pure and Applied Optics*, Opt. 4, (2002), 5 pages.
Stewart, et al., "A New Reconstruction Filter for Undersampled Light Field", *Eurographics Symposium on Rendering*, (2003), 8 pages.
Stone, et al., "OpenCL: The open standard for parallel programming of heterogeneous systems", *Computing in Science & Engineering*, (May 2010), 8 pages.
Tanida, et al., "TOMBO: Thin Obeservation Module by Bound Optics", *Lasers and Electro-Optics Society, 2002. LEOS 2002. The 15th Annual Meeting of the IEEE*, vol. 1, (2002), pp. 233-234.
Todt, et al., "Fast (Spherical) Light Field Rendering with Per-Pixel Depth", *Technical Report, Computer Graphics Group*, University of Siegen, (2007), 8 pages.
Tumblin, Jack et al., "LCIS: A Boundary Hierarchy for Detail-Preserving Contrast Reduction", *ACM Transactions on Graphics, SIGGRAPH 1999 Conference Proceedings*, Los Angeles, CA, pp. 83-90, 1999., pp. 83-90.
Vaish, Vaibhav et al., "Using Plane+ Parallax to Calibrate Dense Camera Arrays", *In Proceedings of IEEE Conference on Computer Vision and Pattern Recognition (CVPR)*, (2004), 8 pages.
Veeraraghavan, et al., "Dappled photography: Mask enhanced cameras for heterodyned light fields and coded aperture refocusing", *ACM Trans. Graph. 26, 3, 69*, 2007, 14 pages.
Wang, et al., "Optical virtual imaging at 50 nm lateral resolution with a white-light nanoscope", *Nature Communications*, (Mar. 1, 2011), 13 pages.
Wang, et al., "The optical microscopy with virtual image breaks a record: 50-nm resolution imaging is demonstrated", *Cornell University Library*, (Jun. 2010), 7 pages.
Wilburn, Bennett et al., "High Performance Imaging Using Large Camera Arrays", *In ACM Transactions Graphics*, (2005), 12 pages.
Wu, et al., "Imaging with Solid Immersion Lenses, Spatial Resolution and Applications", *Proc. IEEE 88*, 1491, (2000), 8 pages.
Wu, et al., "Realization of numerical aperture 2.0 using a gallium phosphide solid immersion lens", *Applied Physics Letters 75*, (1999), 3 pages.
Xiao, Jiangjian et al., "Tri-view Morphing", *Computer Vision and Image Understanding 96*, 3, (2004), pp. 345-366.
Yang, et al., "A Real-Time Distributed Light Field Camera", *Rendering Techniques 2002, Eurographics Workshop Proceedings*, PIS, Italy, Jun. 26-28, 2002, (Jun. 26, 2002), 9 pages.
Zaharia, et al., "Adaptive 3D-DCT Compression Algorithm for Continuous Parallax 3D Integral Imaging", *Signal Processing, Image Communication, Elsevier Scient Publishers*, Amsterdam, NL, vol. 17, No. 3, (Mar. 1, 2002), 12 pages.
Zhang, et al., "A Survey on Image-based Rendering-Representation, Sampling and Compression", *Signal Processing, Image Communication, Elsevier Science Publishers*, vol. 19, No. 1, (Jan. 1, 2004), 28 pages.
Zitnick, et al., "Consistent Segmentation for Optical Flow Estimation", *In Proceedings of IEEE International Conference on Computer Vision (ICCV)*, (2005), 8 pages.
Adelson T., Wang J.: "Single Lens Stereo with a Plenoptic Camera". IEEE Transactions on Pattern Analysis and Machine Intelligence (1992), 99-106.
J. Chai, S. Chan, H. Shum, and X. Tong: "Plenoptic Sampling", ACM Trans. Graph., pp. 307-318, 2000.
F. Durand, N. Holzschuch C. Soler, E. Chan and F. Sillion:"A fequency Analysis of Light Tansport" ACM Trans. Graph., pp. 1115-1126, 2005.
Todor Georgiev and Chintan Intwala: "Light Field Camera Design for Integral View Photography," Adobe Tech. Rep., 2006.

(56) References Cited

OTHER PUBLICATIONS

Steven J. Gortler, Radek Grzeszczuk, Richard Szeliski, and Michael F. Cohen: "The Lumigraph," ACM Trans. Graph., pp. 43-54, 1996.
Levoy M., Hanrahan P.: "Light field rendering," ACM Trans. Graph. (1996), 31-42.
Lippmann G.: Epreuves reversible donnant la sensation du relief ("Reversible Prints Providing the Sensation of Depth"). Journal of Physics 7 (1908), pp. 821-825.
Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005).
Ng R.: "Fourier Slice Photography," Proceedings of ACM SIGGRAPH 2005 (Jan. 2005).
David E. Roberts, History of Lenticular and Related Autostereoscopic Methods:, 2003.
Veeraraghavan, et al., "Dappled Photography: Mask Enhanced Cameras for Heterodyned Light Fields and Coded Aperture Refocusing," ACM Transaction on Graphics, vol. 26, No. 3, 2006, XP002491494.
Stevens R., Harvey T.: "Lens Arrays for a Three-Dimensional Imaging System," Journal of Optics A, vol. 4 (2002).
Levoy, Mark et al., "Light Field Microscopy," Stanford University, Submitted to Siggraph 2006, 5 pages.
Levoy, Mark, "Optical Recipes for Light Microscopes," Stanford Computer Grpahics Laboratory Technical Memo 2006-001, Jun. 20, 2006, 10 pages.
Ng, Ren, et al., "Light Field Photography with a Hand-held Plenoptic Camera," Stanford University, Stanford Tech Report CTSR Feb. 2005.
Georgeiv, et al. "Spatio-Angular Resolution Tradeoff in Integral Photography," Proc. EGSR, 2006, 10 pages.
U.S. Appl. No. 12/144,411, filed Jun. 23, 2008.
U.S. Appl. No. 12/186,396, filed Jun. 23, 2008.
U.S. Appl. No. 11/874,611, filed Oct. 18, 2007.
U.S. Appl. No. 12/111,735, filed Apr. 29, 2008.
U.S. Appl. No. 12/271,389, filed Nov. 14, 2008.
U.S. Appl. No. 12/474,112, filed May 28, 2009.
U.S. Appl. No. 11/627,141, filed Jan. 25, 2007.
U.S. Appl. No. 12/636,168, filed Dec. 11, 2009.
U.S. Appl. No. 12/690,569, filed Jan. 20, 2010.
U.S. Appl. No. 12/690,871, filed Jan. 20, 2010.
U.S. Appl. No. 12/5503,803, filed Jul. 15, 2009.
U.S. Appl. No. 12/628,437, filed Dec. 1, 2009.
U.S. Appl. No. 12/790,677, filed May 28, 2010.
Borman, S., and Stevenson, R., "Super-resolution from image sequences—a review", Proceedings of the 1998 Midwest Symposium on Circuits and Systems, Publication Date: Aug. 9-12, 1998, on pp. 374-378.
Elad, M., and Feuer, A., "Restoration of a single superresolution image from several blurred, noisy, and undersampled measured images," IEEE Transactions on Image Processing Dec. 1997, pp. 1646-1658.
Farsiu, S., Robinson, D., Elad, M., and Milanfar, P., "Advances and challenges in super-resolution," International Journal of Imaging Systems and Technology, 2004, 12 pages.
Isaksen A., McMillan L., Gortler S. J.: "Dynamically Reparameterized Light Fields," ACM Trans. Graph. (2000), 297-306.
Park, S., Park, M., and Kang, M., "Super-resolution image reconstruction: a technical overview," Signal Processing Magazine, 2003, 16 pages.
M. Levoy, "Light Fields and computational Imaging," Computer [Online], vol. 39, No. 8, Aug. 2006, pp. 46-55, XP002501300.
Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.
Georgiev T., Wainer M.: "Morphing Between Multiple Images," Tech. Rep. Apr. 17, 1997, 17 pages.
Lippmann G.: "Epreuves Reversibles Photographies Integrales," Academie des sciences (Mar. 1908), pp. 446-451.
Lees S., Wolberg G., Shin S.: "Polymorph: Morphing Among Multiple Images," IEEE Computer Graphics and Applications (Jan./Feb. 1998), 14 pages.
Naemura T., Yoshida T., Harashima H.: "3d Computer Graphics Based on Integral Photography," Optics Express, vol. 8, 2 (Feb. 6, 2001), 8 pages.
Zitnick C. L., Jojic N., Kang S.: "Consistent Segmentation for Optical Flow Estimation" In Proceedings of IEEE International Conference on Computer Vision (ICCV) (2005), 8 pages.
Seitz S. M., Dyer C. R.: "View Morphing," ACM Trans. Graph. (1996), 21-30.
Stewart J., Yu J., Gortler S. J., McMillan L.: "A New Reconstruction Filter for Undersampled Light Field," Eurographics Symposium on Rendering (2003), 150-156.
Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004), 8 pages.
Xiao J., Shah M.: "Tri-view Morphing," Computer Vision and Image Understanding 96, 3 (2004), 345-366.
Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.
Lumsdaine A., Georgiev T.: Full Resolution Lightfield Rendering. Tech. rep., Adobe Systems, Jan. 2008, 12 pages.
Baker S., Kanade T.: Limits on superresolution and how to break them. IEEE Transactions on Pattern Analysis and Machine Intelligence (Jan. 2002), 377 pages.
Bishop T. E., Zanetti S., Favaro P.: Light field superresolution. In International Conference on Computational Photography (Apr. 16-17, 2009), 4 pages.
Levin A., Fergus R., Durand F., Freeman W.: Image and depth from a conventional camera with a coded aperture. ACM Transactions on Graphics. SIGGRAPH 2007 Conference Proceedings, San Diego, CA (2007), 10 pages.
Lin Z., Shum H.: Fundamental limits of reconstruction-based superresolution algorithms under local translation. IEEE Transactions on Pattern Analysis and Machine Intelligence 26, 1 (Jan. 2004), 83-97.
Ng M. K., Bose N. K.: Mathematical analysis of super-resolution methodology. Signal Processing Magazine, IEEE 20, 3 (2003), 62-74.
Schultz R.: Super-resolution enhancement of native digital video versus digitized NTSC sequences. In Proceedings of the Fifth IEEE Southwest Symposium on Image Analysis and Interpretation (2002), pp. 193-197.
Georgiev T., Lumsdaine A.: Depth of field in plenoptic cameras. In Eurographics 2009—Annex (Apr. 2009), pp. 5-8.
Lumsdaine A., Georgiev T.: The focused plenoptic camera. In International Conference on Computational Photography (Apr. 2009), 8 pages.
Levoy, et al. "Recoring and contolling the 4D light field in a micrscope using micolens arrays"Jounal of Micoscopy, 2009, 19 pages.
Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.
Shree K. Naar, Vlad Branzoi, Terry E. Boult, "Programmable Imaging using a Digitl Micomiror Array", Shree K. Nayar, Vlad Branzoi, Terry E. Boult, In Conf. on Computer Vision and Pattern Recognition, pp. I: 436-443, 2004.
J. Neumann, et al., "Eyes from Eyes Analysis of Camera Design Using Plenoptic Video Geometry," Dec. 2001, 20 pages, XP002509893.
Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.
Yang, J C, et al., "A Real-Time Distributed Light Field Camera," Rendering Techniques 2002, Eurographics Workshop Proceedings, PIS, Italy, Jun. 26-28, 2002, 9 pages.

(56) References Cited

OTHER PUBLICATIONS

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.

Chang, et al., "Light Field Compression Using Disparity-Compensated Lifting and Shape Adaptation," IEEE Transactions on Image Processing, vol. 15, No. 4, Apr. 2006, pp. 793-806.

Sebe, et al., "Mutli-View Geometry Estimation for Light Field Compression," VMV 2002, 8 pages.

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

JP504669 (1975), all pages, english equivalent is U.S. Patent 3985419, dated Oct. 12, 1976 by Matsumoto, et al.

Georiev, et al., "Light-Field Capture by Multiplexing in the Frequency Domain," Adobe Technical Report, Apr. 2007.

"Final Office Action", U.S. Appl. No. 12/957,320, filed Jun. 27, 2013, 16 pages.

"Final Office Action", U.S. Appl. No. 12/957,322, filed Aug. 12, 2013, 16 pages.

"Non-Final Office Action", U.S. Appl. No. 12/957,308, filed Jul. 25, 2013, 18 pages.

"Supplemental Notice of Allowance", U.S. Appl. No. 12/186,392, filed Jul. 19, 2013, 5 pages.

"Final Office Action", U.S. Appl. No. 12/957,316, filed Sep. 26, 2013, 16 pages.

"Non-Final Office Action", U.S. Appl. No. 12/957,312, filed Aug. 28, 2013, 17 pages.

"Non-Final Office Action", U.S. Appl. No. 13/288,759, filed Sep. 11, 2013, 11 pages.

"Supplemental Notice of Allowance", U.S. Appl. No. 12/186,392, Aug. 27, 2013, 2 pages.

\* cited by examiner

Figure 3A  Figure 3B
Figure 4A  Figure 4B

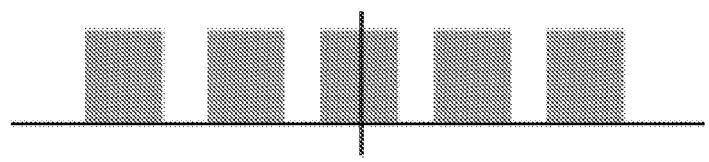
Figure 7A
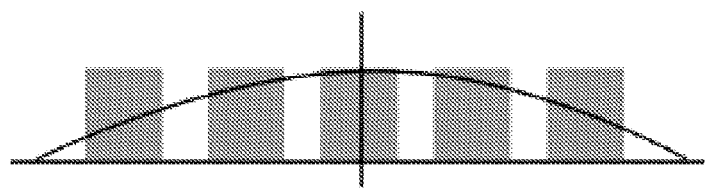
Figure 7B
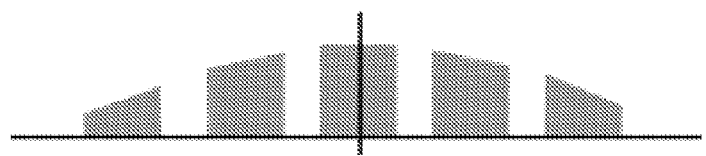
Figure 7C
 
Figure 8A  Figure 8B

MANAGING ARTIFACTS IN FREQUENCY DOMAIN PROCESSING OF LIGHT-FIELD IMAGES

RELATED APPLICATION

This application is a continuation of U.S. application Ser. No. 12/130,725, filed May 30, 2008, now U.S. Pat. No. 8,244,058 which is incorporated by reference herein in its entirety.

BACKGROUND

Description of the Related Art

Conventional cameras fail to capture a large amount of optical information. In particular, a conventional camera does not capture information about the location on the aperture where different light rays enter the camera. During operation, a conventional digital camera captures a two-dimensional (2-D) image representing a total amount of light that strikes each point on a photosensor within the camera. However, this 2-D image contains no information about the directional distribution of the light that strikes the photosensor. Directional information at the pixels corresponds to locational information at the aperture.

In contrast, light-field cameras sample the four-dimensional (4-D) optical phase space or light-field and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

Light-fields may be captured with a conventional camera. In one conventional method, M×N images of a scene are captured from different positions with a conventional camera. If, for example, 8×8 images are captured from 64 different positions, 64 images are produced. The pixel from each position (i, j) in each image are taken and placed into blocks, to generate 64 blocks.

FIG. 1A illustrates an exemplary prior art light-field camera, or camera array, which employs an array of two or more objective lenses 110. Each objective lens focuses on a particular region of photosensor 108, or alternatively on a separate photosensor 108. This light-field camera 100 may be viewed as a combination of two or more conventional cameras that each simultaneously records an image of a subject on a particular region of photosensor 108 or alternatively on a particular photosensor 108. The captured images may then be combined to form one image.

FIG. 1B illustrates an exemplary prior art plenoptic camera, another type of light-field camera, that employs a single objective lens and a microlens or lenslet array 106 that includes, for example, about 100,000 lenslets. Lenslet array 106 is typically placed a small distance (~0.5 mm) from a photosensor 108, e.g. a charge-coupled device (CCD). The raw image captured with a plenoptic camera 102 is made up of an array of small images, typically circular, of the main camera lens 108. These small images may be referred to as microimages. The lenslet array 106 enables the plenoptic camera 102 to capture the light-field, i.e. to record not only image intensity, but also the distribution of intensity in different directions at each point. Each lenslet splits a beam coming to it from the main lens 104 into rays coming from different "pinhole" locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. Each macropixel contains different angular samples of the light rays coming to a given microlens. Each macropixel contributes to only one pixel in the different angular views of the scene. As a result, each angular view contains 100,000 pixels.

Another type of integral or light-field camera is similar to the plenoptic camera of FIG. 1B, except that an array of pinholes are used between the main lens and the photosensor instead of an array of lenslets.

Yet another type of integral or light-field camera is similar to the plenoptic camera of FIG. 1B, except that a non-refractive mask is used between the main lens and the photosensor instead of an array of lenslets. The mask is a non-refractive element, and attenuates the incoming rays but does not bend them. The captured image is the convolution of the incoming light field with the mask light field. This camera design captures the 4-D light field directly in the Fourier domain. Thus, a 2-D sensor pixel represents a coded linear combination of several rays. The linear combination can be decoded by software to obtain the 4-D light field.

Frequency Domain Processing of Light-Field Images

Light-field capture may be analyzed in spatio-angular representation. A light-field camera may sample the optical signal within a single photograph by multiplexing the 4-D radiance onto the physical 2-D surface of the sensor. In addition to sampling the light field spatially, methods have been developed for multiplexing the radiance in the frequency domain by optically mixing different spatial and angular frequency components. The idea of multiplexing the 4-D light field onto a 2-D sensor is extremely note-worthy and powerful. More specifically, the idea that the use of a simple mask can turn a conventional camera into a ligthfield camera is very practical. This approach requires processing the captured light-fields in the frequency domain. The general concept of processing data in the frequency domain with traditional tools like Fourier transform is fairly straightforward, but there are implementation details and caveats that need to be considered in order to obtain visually pleasing results.

Various techniques for analyzing radiance in the frequency domain have been developed. Along with techniques for analyzing radiance in the frequency domain, a number of good results have been derived, such as application of Poisson summation formula to depth representation, general light fields and displays, optical transforms, Fourier slice theorem applied to refocusing, and others. However, one area that has not achieved full attention is the quality of the resultant images. This is because achieving high quality results by doing frequency domain processing as a primary method of decoding the 4-D light field, is nontrivial. Although the overall method of decoding the light field is relatively straightforward, there are various limitations in getting things just right. Thus, results are prone to artifacts due to these limitations that are inherent to the frequency-domain processing of images and in image processing techniques in general.

SUMMARY

Various embodiments of a method and apparatus for managing artifacts in frequency domain processing of light-field images are described. Various limitations inherent to conventional methods of frequency-domain processing of light-field images may result in artifacts in the resulting output images. Various methods for the reduction or removal of the artifacts are described that include methods applied during frequency domain processing of light-field images and methods applied as or during post-processing of the results of frequency domain processing. The described methods for the removal of artifacts may be implemented in software as or in one or more light-field frequency domain processing modules. The module(s) may, for example, be implemented in a light-field image processing application or library. In some embodiments, one or more of the described methods for artifact removal may be implemented as components in or sub-modules of a light-field frequency domain processing module.

The process of light-field capture through mask-based or lens-based light-field cameras multiplexes the angular information within a 4-D light field visible in the 2-D Fourier transform of the acquired image. This 2-D Fourier transform reveals slices which correspond to each angular view. These modulated slices may be demodulated (or simply cropped) and rearranged into a 2-D stack. The center of a slice is generally determined as the pixel with the highest absolute value or frequency. However, a center determined as the pixel with the highest absolute value may not be the true center, i.e. the DC point, of the underlying analog signal. Incorrect centers of the slices may result in wave artifacts in the resultant angular views. In one embodiment, an oversampling method may be implemented to determine the correct analog centers of the slices. In one embodiment, a phase multiplication method may be implemented to determine the correct analog centers of the slices. Angular views may be generated from the slices using the determined correct centers. Determining and using the correct centers (the DC points) of the underlying analog signals may help to reduce or eliminate wave artifacts from the resultant angular views.

In one embodiment, two or more low-energy slices may be excluded from the demultiplexing process. The excluded slices may be the slices closest to the central slice or DC point, and are the slices containing the lowest energy. Excluding the low-energy slices may help to reduce or eliminate wave artifacts from the resultant angular views.

Angular views may be generated from the slices. The angular views may still include some artifacts. In one embodiment, a cosmetic correction of the intermediate angular views may be performed to generate corrected output angular views. After frequency domain processing is performed to generate a set of angular views, a base angular view may be selected. Cosmetic correction of the other angular views, or of at least a portion of the other angular views, may then be performed to adjust the other angular views according to the base angular view. In one embodiment, the pixel values of an angular view may be adjusted according to a Gaussian filter comparison of the angular view to the base angular view to generate a corrected angular view.

BRIEF DESCRIPTION OF THE DRAWINGS

FIGS. 3A and 4A illustrate exemplary angular views in which intensity waves appear as an artifact of conventional frequency domain processing of respective raw light-field images.

FIGS. 3B and 4B illustrate the angular views of FIGS. 3B and 4B with artifacts removed according to embodiments of the methods described herein.

FIGS. 7A through 7C graphically illustrate an exaggerated effect of a transfer function on the signal in the frequency domain.

FIG. 8A shows an angular view without applying a phase multiplication method to detect the correct centers of slices.

FIG. 8B shows the angular view of FIG. 8A for which an embodiment of a phase multiplication method was applied to detect the correct centers of slices.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for managing artifacts in frequency domain processing of light-field images are described. Various limitations inherent to conventional methods of frequency-domain processing of light-field images may result in artifacts in the resulting output images. A discussion of the characteristics, sources and effects of artifacts that affect the quality of the results of frequency domain processing of light-field images is provided. Various methods for the reduction or removal of the artifacts are described. The methods include methods applied during frequency domain processing of light-field images and methods applied as or during post-processing of the results of frequency domain processing. The described methods for the removal of artifacts may be implemented in software as or in one or more light-field frequency domain processing modules. The module(s) may, for example, be implemented in a light-field image processing application or library. In some embodiments, one or more of the described methods for artifact removal may be implemented as components in or sub-modules of a light-field frequency domain processing module.

A process of light-field capture through mask-based or lens-based light-field cameras may multiplex the angular information within a 4-D light field visible in the 2-D Fourier transform of the acquired image. This 2-D Fourier transform reveals slices which correspond to each angular view. These modulated slices may be demodulated (or simply cropped) and rearranged into a 2-D stack. An inverse 2-D Fourier transform may then be performed on slices in the stack to generate angular views of the scene in the acquired image. Each angular view may represent a scene captured in the light-field image at a particular focal plane.

Figure 1A:
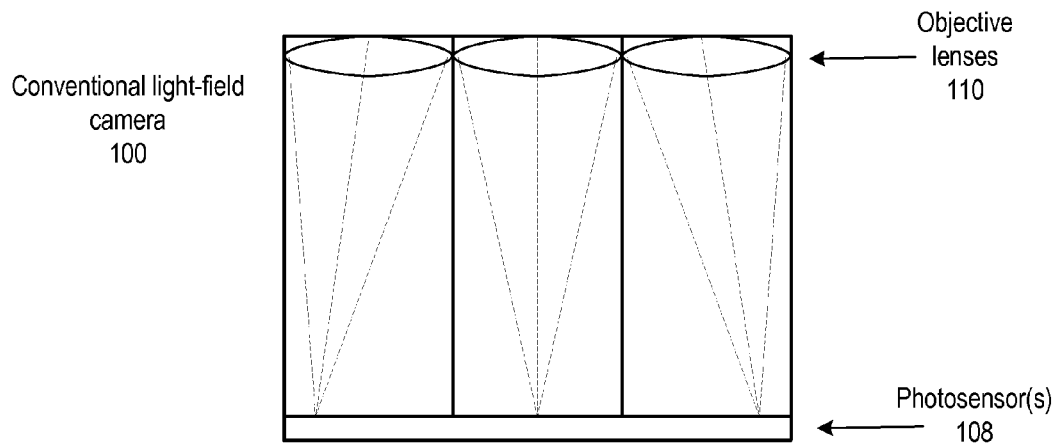
FIG. 1A illustrates an exemplary prior art light-field camera, or camera array.
Figure 1B:
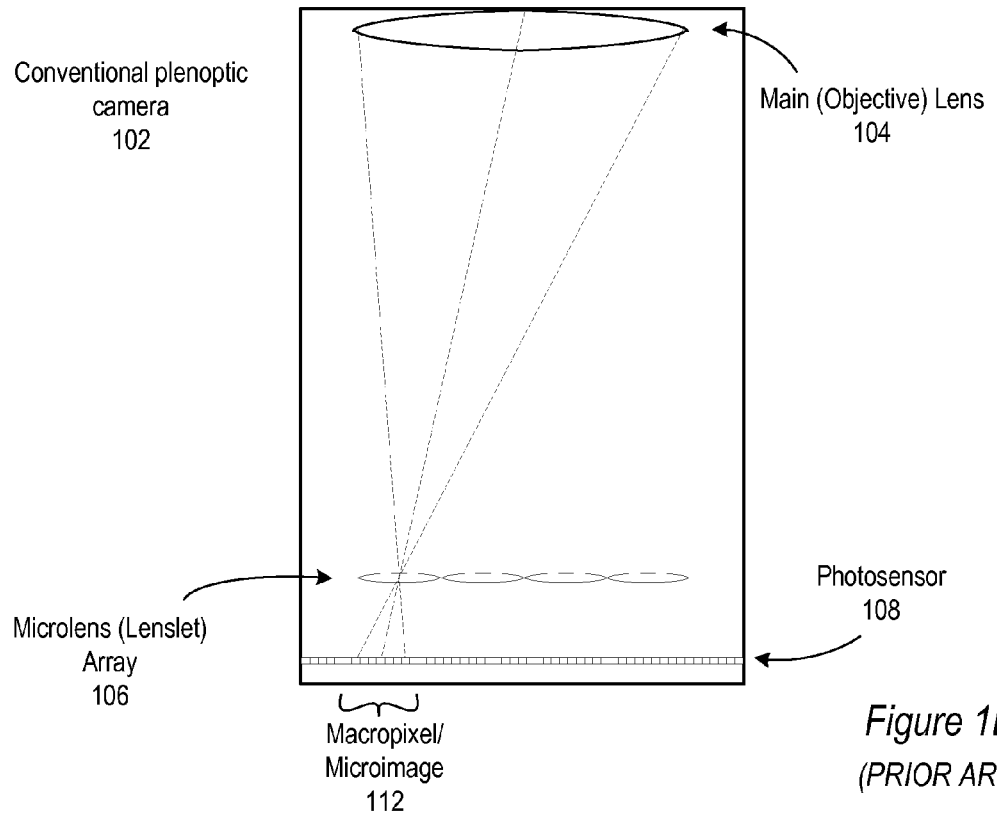
FIG. 1B illustrates an exemplary prior art plenoptic camera.
Figure 2:
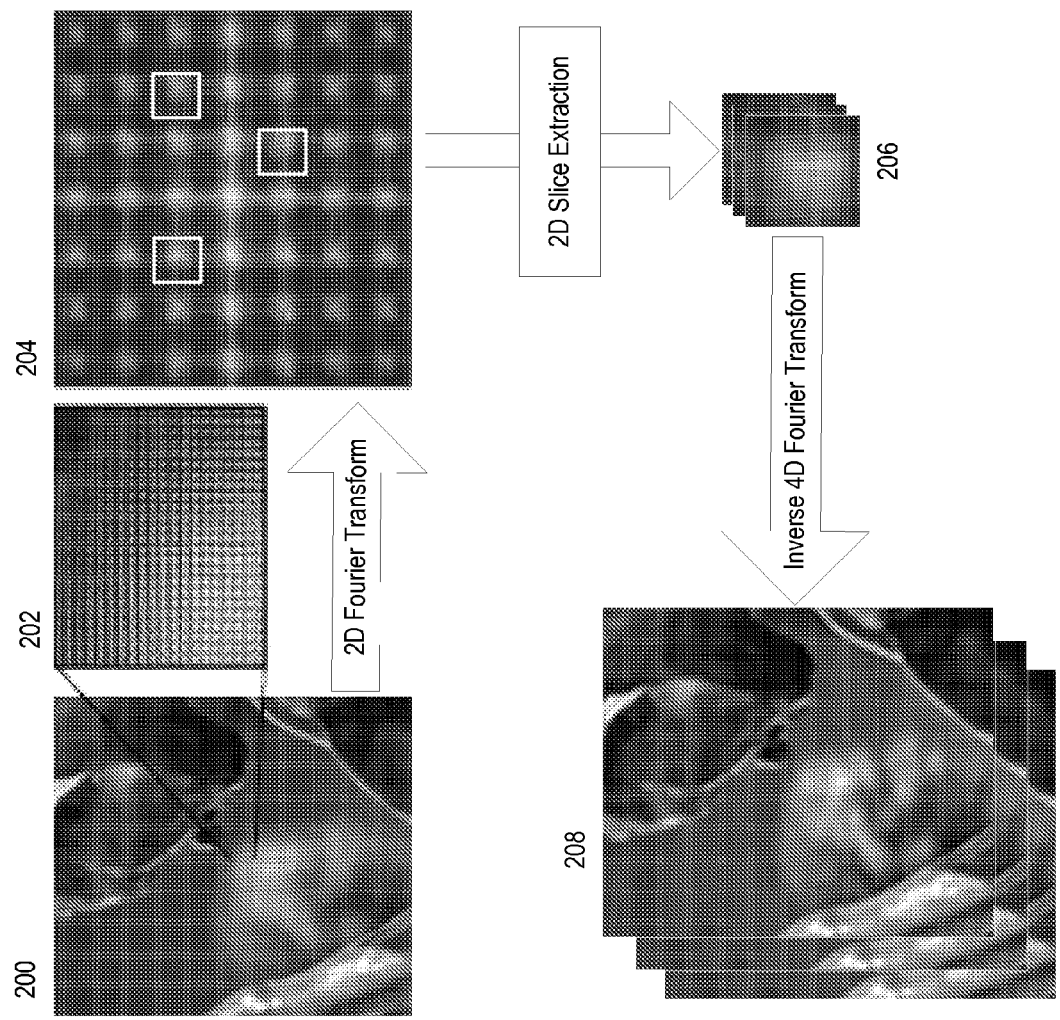
FIG. 2 illustrates an exemplary method for the frequency domain processing of a captured light-field image.

FIG. 2 illustrates an exemplary method for the frequency domain processing of a captured light-field image. An exemplary raw light-field image 200 is captured with a light-field camera, for example a plenoptic camera 102 as illustrated in FIG. 1B. Region 202 shows an expanded region of exemplary light-field image 200 including multiple microimages. Note that raw light-field images captured with other types of light-field cameras may look visually different than exemplary images 200 and 202. A two-dimensional (2-D) Fourier transform is performed on light-field image 200 to generate a frequency domain image 204. Two-dimensional (2-D) slice extraction is performed to generate multiple slices 206. Centers of the slices may be determined, and one or more stacks of slices may be generated. A 4-D inverse Fourier transform may be performed on the stacks of slices to generate results, in this example multiple images 208 focused at different depths. The multiple images 208 each represent a distinct angular view of the captured scene. The frequency domain processing may be performed on each color channel of an image separately (e.g., Red, Green, and Blue, for RGB images), and the color channels may then be aligned and merged after the frequency-based processing is complete.

Frequency Domain Processing Artifacts

The artifacts that result from frequency domain processing of light-field images are best visible as an intensity wave across the various angular views (e.g., images 208 of FIG. 2). These waves may appear as random low frequency waves that are present spatially within a single angular view, but that appear to travel across multiple angular views. Despite the fact that the waves appear in individual angular views, the waves may partially or completely disappear when the views are mixed for an application such as refocusing. FIGS. 3A and 4A illustrate exemplary angular views in which intensity waves appear as an artifact of conventional frequency domain processing of respective raw light-field images.

In addition to the wave-like artifact, a set of angular views generated by conventional frequency domain processing of a light-field image may appear to be warped in a peculiar way such that when the angular views are viewed in a movie, a wind-like movement or artifact may be apparent.

Another type of artifact that may appear is chromatic aberration, which may result from an incorrect alignment of the separately-processed color channels (e.g., Red, Green, and Blue, for RGB images) after frequency-based processing.

Sources of Wave Artifacts

The process of light-field capture through mask-based or lens-based light-field cameras multiplexes the angular information within a 4-D light field visible in the 2-D Fourier transform of the acquired image. as the modulated slices (e.g., slices 206 of FIG. 2) may be demodulated (or simply cropped) and rearranged into a 2-D stack. As a result, a crucial step involved in processing is to detect the correct centers of these slices. The center of a slice is generally determined as the pixel with the highest absolute value. However, a center determined as the pixel with the highest absolute value may not be at the true center or DC point of the underlying analog signal. The true center or DC point of the analog signal may be assumed to be within one pixel of the pixel with the highest absolute value. Assuming the center of the slice is determined to be (x, y), the actual location of the center (the center or DC point of the underlying signal) may be expressed by (x+δx, y+δy) where |δx, δy|<1.

Incorrect detection of the centers of these slices directly corresponds to modulation of these cropped slices by a very low frequency. Since a discrete Fourier transform (DFT) samples the underlying discrete-time Fourier transform (DTFT) of the image, detection of the discrete location (a pixel) of the peak (the center) can be correct only within a 1-pixel neighborhood. In other words, the DC point of the underlying analog signal, the correct center of the slice, is within a 1-pixel neighborhood of the detected pixel location. Also, there may be cases where the detected center can be completely incorrect, due to the fact that the original signal contains large low-frequency side-lobes. Incorrect centers for slices is responsible for one of the most prominent artifacts that arise in the results obtained by light field cameras—the traveling intensity waves, as illustrated in FIGS. 3A and 4A.

Sources of Wind Artifacts

Figure 5:
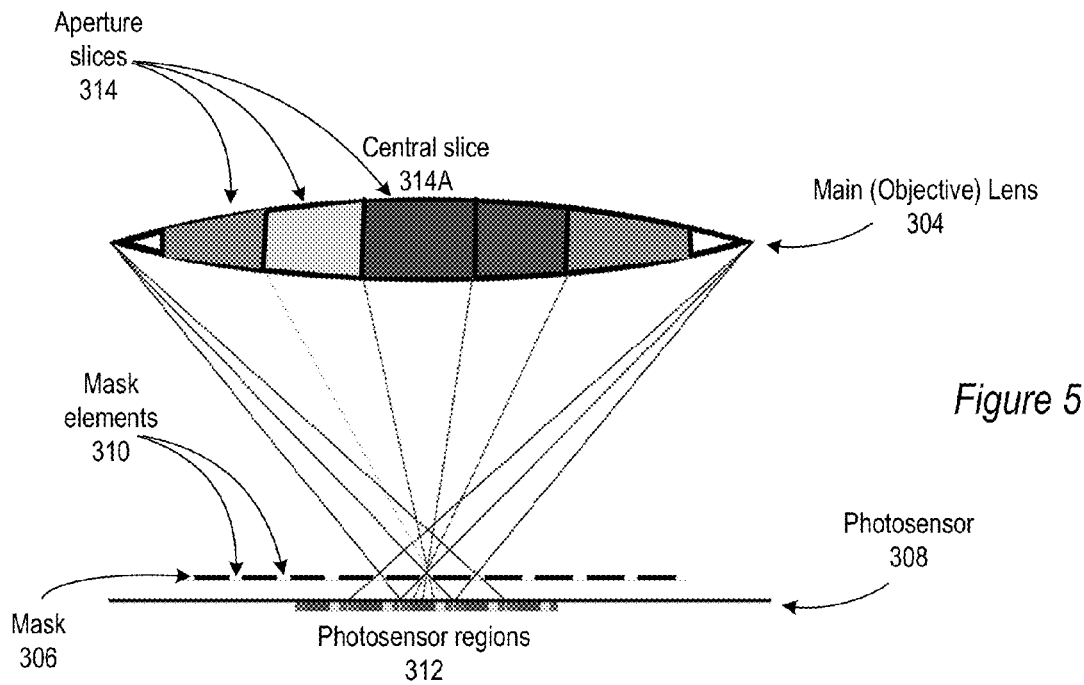
FIG. 5 illustrates a light-field camera in which the F-number of the optical systems consisting of the mask elements and the photosensor is equal to the F-number of the optical system consisting of the photosensor and the main lens.

Another type of artifact may be seen as a wind-like movement across a set of angular views generated by conventional frequency domain processing of a light-field image. One possible explanation for this wind-like artifact may be related to the circular aperture of cameras and the F-numbers of the main lens and the elements in the lens array or mask situated between the main lens and the photosensor. Referring to FIG. 5, in a light-field camera, each of the elements 310 (lenslet, pinhole, etc.) in the mask 306 captures a different part or view (aperture slices 314) of the main aperture or lens 304 on a different region 312 of the photosensor 308. The photosensor 308 thus captures light from different slices 314 of the main lens 304 as microimages at different locations or regions 312 on the photosensor 308.

FIG. 5 illustrates the case where the F-number of the optical systems consisting of the mask elements 310 and the photosensor 308 is equal to the F-number of the optical system consisting of the photosensor 308 and the main lens 304.

Each slice 314 of the aperture, because the lens is circular, captures a different amount of light; the central slice 314 captures the largest amount of light. As a result, each microimage captured on the photosensor 308 contains a different amount of light. When these microimages are put together to form one coherent angular view, the views contain different intensity. This may result in the described wind-like artifact.

Figure 6:
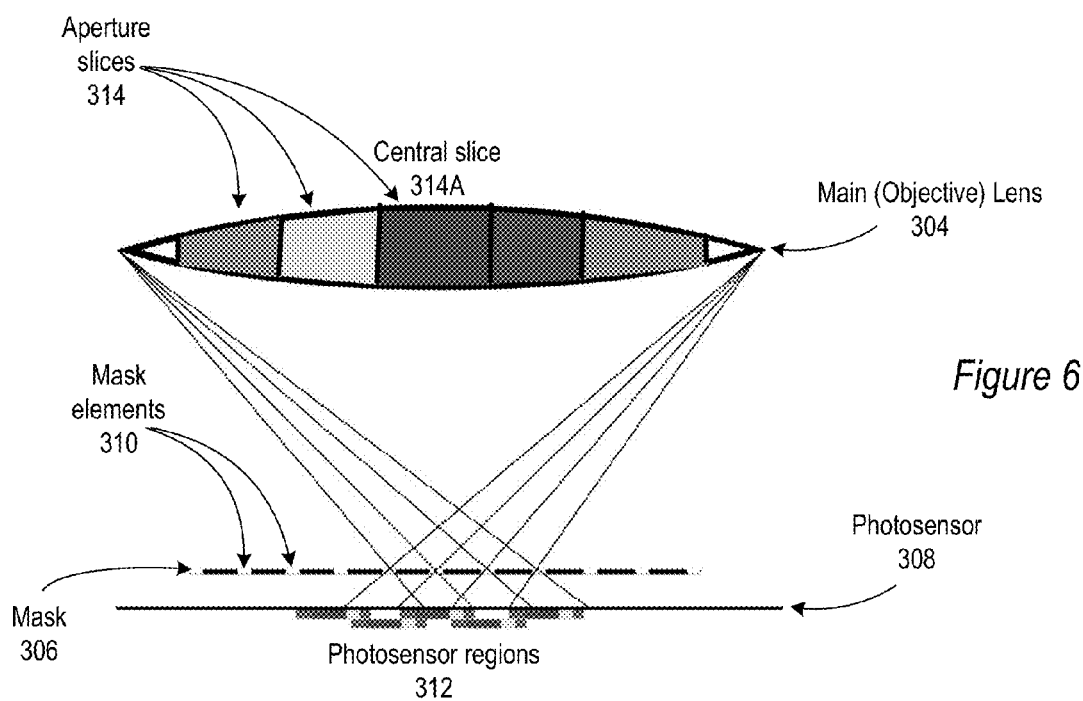
FIG. 6 illustrates a light-field camera in which the F-number of the optical systems consisting of the mask elements and the photosensor is not equal to the F-number of the optical system consisting of the photosensor and the main lens.

The wind-like artifact may be worsened when considering the case of FIG. 6. In the light-field camera of FIG. 6, the F-number of the optical systems consisting of the mask elements 310 and the photosensor 308 is different than the F-number of the optical system consisting of the photosensor 308 and the main lens 304. As a result, the microimages in regions 312 overlap each other on the photosensor 308. This results in the edges of the microimages containing overlapping information from neighboring microimages. However, this spatially neighboring information is not well-neighboring from an angular information point of view. This means that there may be redundant information in the farthest angular views.

The above assumes a best-case scenario where the physical mask 306 is optically high quality and is placed equidistant from the photosensor 308. Distance of the mask 306 from the photosensor 308 directly effects amount of overlapping angular information. This may also be viewed as spatial aliasing for which the frequency counterpart can be understood in the angular dimension. If the mask 306 were physically spaced unevenly in relation to the photosensor 308, this would correspond to the diffusion of angular information across microimages. This diffusion can be confined to different regions of the image as it is simply controlled by the distance of the mask 306 from the photosensor 308.

In addition, when all of the angular views are extracted, each pixel does not necessarily correspond to the same view because of the above-described phenomena. This observation leads to the conclusion that the true angular view is not a simple frame in the space-time volume of angular views, but rather a surface within the volume.

Another source of artifacts may due to the optical transfer function of the lens or the pre-mask optical system. FIGS. 7A through 7C graphically illustrate an exaggerated effect of this transfer function on the signal in the frequency domain. FIG. 7A illustrates the Fourier transform of the original light field before it passes through the camera optical system. FIG. 7B illustrates the hypothetical transfer function of the camera's optical system. FIG. 7C illustrates the resulting light field as captured by the photosensor. It is evident in FIG. 7C that the angular slices are not symmetric, causing the overall result of the entire process to be complex instead of real. The effect of this attenuation function is more difficult to correct when approaching high frequencies, as it becomes harder to invert. This problem is similar to a traditional signal processing problem of amplitude demodulation in the presence of a memory-less channel.

Methods of Artifact Removal

This section presents various methods of artifact removal that may be implemented in various embodiments of a light-field frequency domain processing module. The methods include methods applied during frequency domain processing of light-field images and methods applied as or during post-processing of the results of frequency domain processing.

The first two described methods of artifact removal in frequency domain processing of light-field images are directed at finding the correct center of the Fourier slices (e.g., slices 206 in FIG. 2). As described above, determining the correct center of the Fourier slices (e.g., slices 206 in FIG. 2) is important in removing artifacts, specifically wave artifacts. In an extremely well-calibrated light-field camera, the correct location of the centers may be predetermined. However, for most light-field cameras, this is difficult or impossible to achieve. Another way to view this problem is to find the location of the carrier frequencies (of the mask or microlens array) in the observed image. Referring to traditional signal processing, putting a mask in front of a photosensor corresponds to modulating the signal with a carrier frequency. Modulation simply replicates the FFT of the signal at the location of the carrier frequencies in the FFT. Therefore, the centers of the slices are the same as the locations of the carrier frequencies contained in the optical mask or the lens array.

Oversampling

One method to more correctly detect the center of a Fourier slice (e.g., a slice 206 in FIG. 2) that may be implemented in embodiments of a light-field frequency domain processing module is to oversample the Discrete Fourier transform (DFT) of the light-field image, for example by two or three times, extract the slices from the oversampled DFT of the image, and find the centers of the slices. In one embodiment, oversampling is performed by padding the acquired light-field image with the correct amount of zeros according to the oversampling rate and taking the Fourier transform of the padded image. Oversampling the DFT of the light-field image may provide better clarity as to where the underlying peak or center (the DC point) of the analog signal actually lies.

However, due to practical limitations of memory and other resources on various operating systems and computing devices, this may be difficult to achieve with straightforward FFT implementations.

Phase Multiplication

An alternative method to oversampling for detecting the exact centers of the Fourier slices (e.g., slices 206 of FIG. 2) that may be implemented in embodiments of a light-field frequency domain processing module employs phase multiplication as described below. For most practical examples, the neighborhood of certainty for the center of the slices lies within an area of 1×1 pixel, and subpixel-accurate location of the center of the slices is being sought. Assume the center is determined to be (x, y); however, the actual location of the center is (x+δx, y+δy) where |δx, δy|<1. Instead of shifting the entire slice by (δx, δy), embodiments may use the following property of Fourier-transform:

$$F\{x(x+\delta t)\}=F(\overline{\omega})e^{i\delta t}$$

A slice $S_i$ may be multiplied by the phase factor:

$$e^{-i\left(\frac{2\pi\delta x}{N}x+\frac{2\pi\delta x}{M}y\right)}$$

After multiplying by the above phase factor, the inverse Fourier transform may be computed to get $S_{i,mid}$. $S_{i,mid}$ is then rearranged in 2-D, and another 2-D-inverse Fourier-transform is performed in order to obtain the angular views (e.g., views 208 of FIG. 2). As a result, the overall process, e.g. as illustrated in FIG. 2:

4-DIFT(arrangein4-D(R($\omega_x$, $\omega_\theta$)))

is replaced with:

2-DIFT(arrangein2-D(correct phase(arragein2-D(R($\omega_x$, $\omega_\theta$)))).

Various automated or manual methods may be used in various embodiments to detect the motion (δx, δy). In on embodiment, a "brute force" or manual method may be used in order to detect the shift in which a user visually determines a best set of output angular views. FIG. 8A shows a resultant angular view without applying the above phase multiplication method, and FIG. 8B shows a resultant angular view from the same light-field image to which an embodiment of the phase multiplication method was applied.

Skipping or Excluding the Lowest Slices

One embodiment of a light-field frequency domain processing module may exclude the "lowest slices" from the demultiplexing process. The lowest slices are the slices with the lowest energy, and are the slices closest to the center slice. The center slice contains the DC point; the lowest slices are the slices closest to the DC point that are not the center slice. Slices higher (or further) from the center of the transform contain higher and higher frequencies. Slices closer to the center, or the DC point, contain more low energy or low frequencies.

Observation and experiments with various light-field camera designs indicates that there are cases when the effect of low intensity waves is severe. That is, major regions of all angular views are nearly or completely black. This indicates that the intensity wave is fairly stationary across all the angular views. This may correspond to a very low-frequency component that corrupts the results in the angular dimension. Such corruption appears to be introduced through the carrier (or modulator). Excluding the lowest modulated slices, the slices closest to the central slice or DC point, which are the slices containing the lowest energy, from the entire demultiplexing process may result in the wave artifacts almost completely disappearing. FIG. 3B illustrates an exemplary angular view for which the lowest slices were excluded during processing.

Cosmetic Correction

The above methods may be applied by embodiments of a light-field frequency domain processing module during frequency domain processing of light-field images. However, these methods may remove some, or most, artifacts, but may not remove all artifacts; even with the application of the above-described methods, vignetting-type artifacts, varying color-shifts, or other wavy artifacts in image intensity may still be visible in some output angular views. Thus, as an alternative to, or in addition to, the above-described methods, some embodiments may provide a method for artifact removal during a post-processing stage. If the previously described methods are not applied during frequency domain processing, or if one or more of the methods are applied but the resulting angular views still display some artifacts, a post-processing cosmetic correction technique may be applied to remove some or all remaining artifacts to improve the look of the resultant angular view(s) generated by the frequency domain processing. A supposition is made that any artifacts are present in the low-frequency content of the image. In accordance with this supposition, the cosmetic corrections are targeted at the low-end of the image spectrum.

The cosmetic correction method is additive in nature; however, the cosmetic correction method may greatly increase the visual quality of the extract angular views. As previously mentioned, frequency-domain processing of a light-field image generates multiple angular views, e.g. views 206 of FIG. 2. In the cosmetic correction method, one of the angular views is selected as a base view; the base view is the best view according to color/intensity as determined by a human observer or operator or by an automated technique, and then one or more of the other angular views are adjusted to match (color/intensity) the selected, or base, view. The cosmetic correction method is essentially a color/intensity matching process. A base view is selected, and the pixel values in one or more of the other angular views are adjusted according to the pixel values in the base view to generate cosmetically corrected angular views from the one or more of the other angular views. Referring to the base view as $S_{base}$, one or more other angular views are adjusted according to the following formula:

$$S_{i,new} = S_i + \text{Filter}(S_{base} - S_i)$$

Here, Filter( ) is a low-pass filter. For the sake of speed, this may be accomplished in one embodiment by:

$$\text{Filter}(x) = \text{gaussian}(\sigma) * \text{downsample}(x)$$

Figures 9A, 9B:
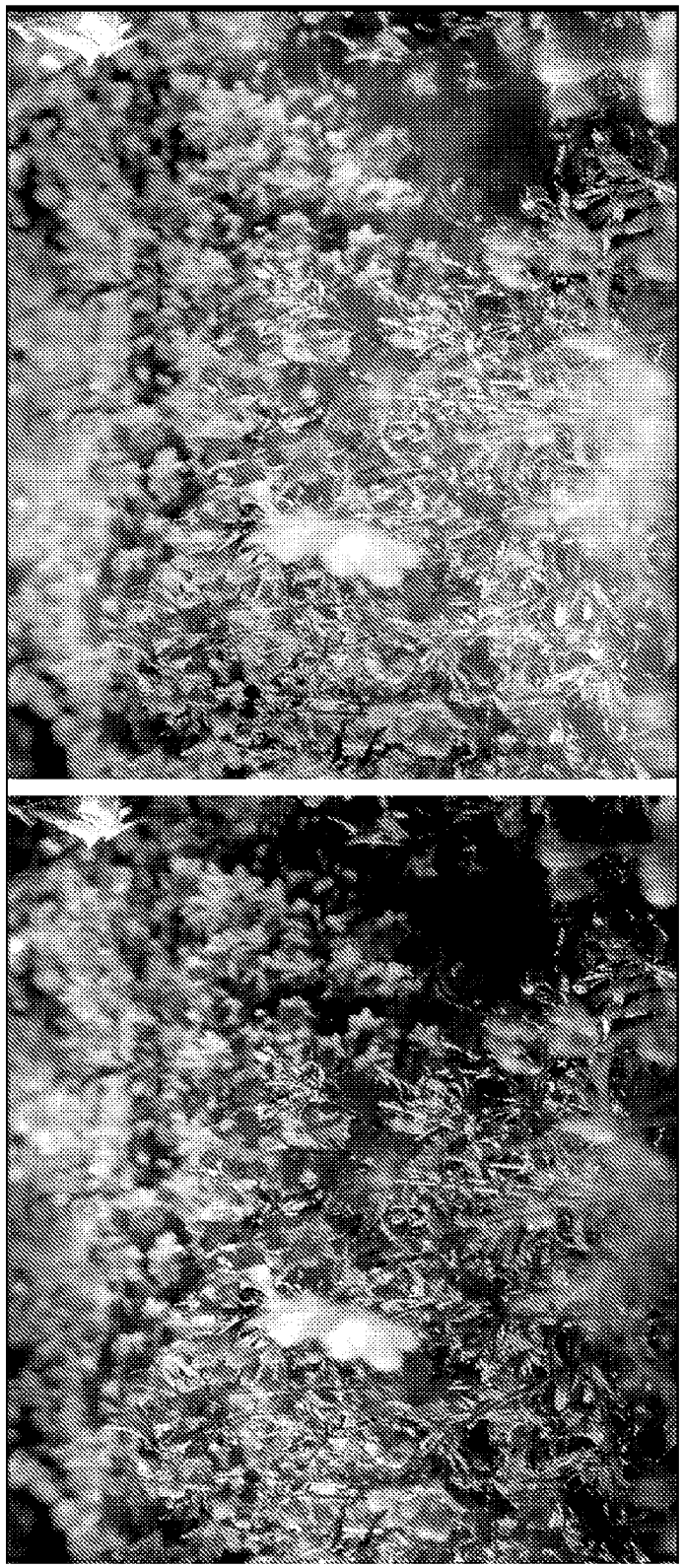
FIGS. 9A and 9B illustrate an angular view before and after application of a cosmetic correction method, according to one embodiment.

The exemplary angular view illustrated in FIG. 4B was obtained using the above-described cosmetic correction method. In addition, FIG. 9A shows an original angular view, and FIG. 9B shows the same view after application of the cosmetic correction method. Note that, while the results are chromatically correct, darker regions may be replaced with blurry content by the cosmetic correction method.

Implementations

Figure 17:
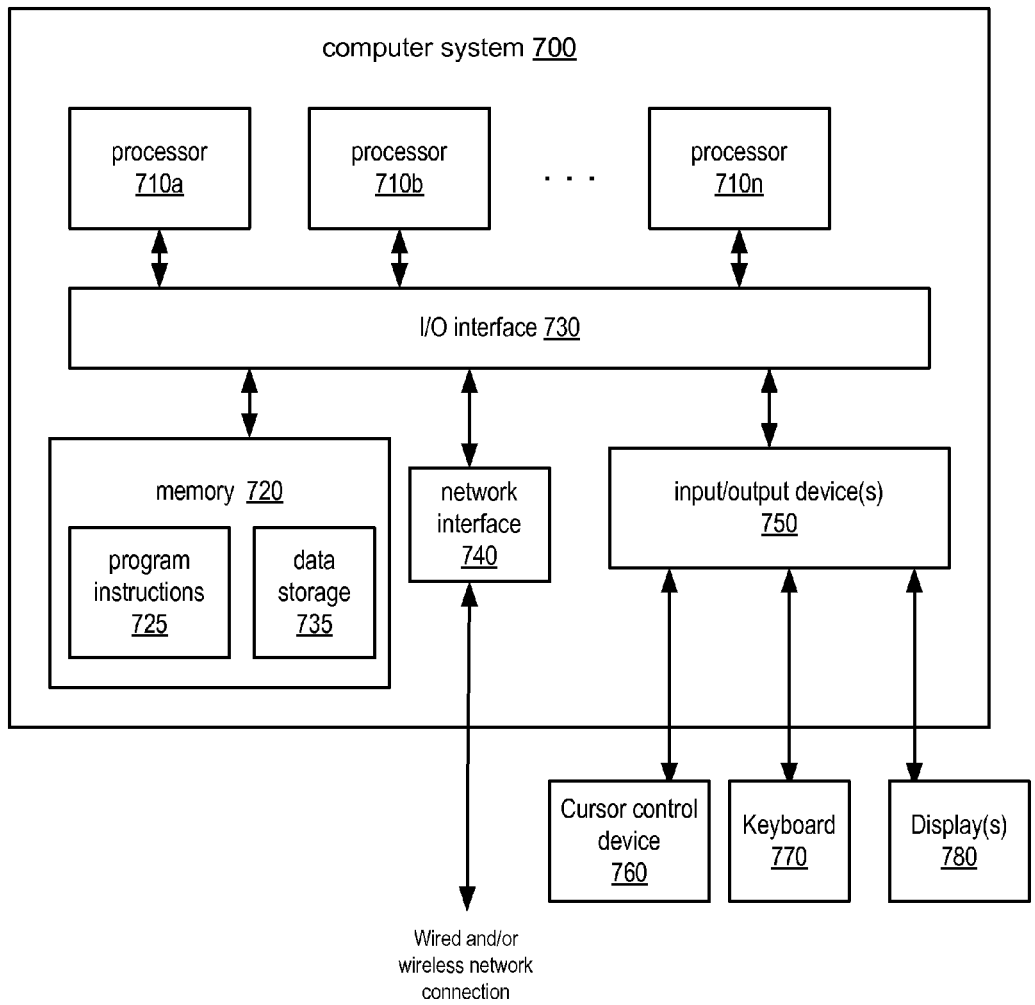
FIG. 17 illustrates an exemplary computer system that may be used in embodiments.

Various methods for the reduction or removal of the artifacts have been described. The methods include methods applied during frequency domain processing of light-field images and methods applied as or during post-processing of the results of frequency domain processing. The described methods for the removal of artifacts may be implemented in software as or in one or more light-field frequency domain processing modules. The module(s) may, for example, be implemented in a light-field image processing application or library. In some embodiments, one or more of the above-described methods for artifact removal may be implemented as component(s) in a light-field frequency domain processing module. An exemplary hardware system on which various embodiments may be instantiated is illustrated in FIG. 17.

Figure 10A:
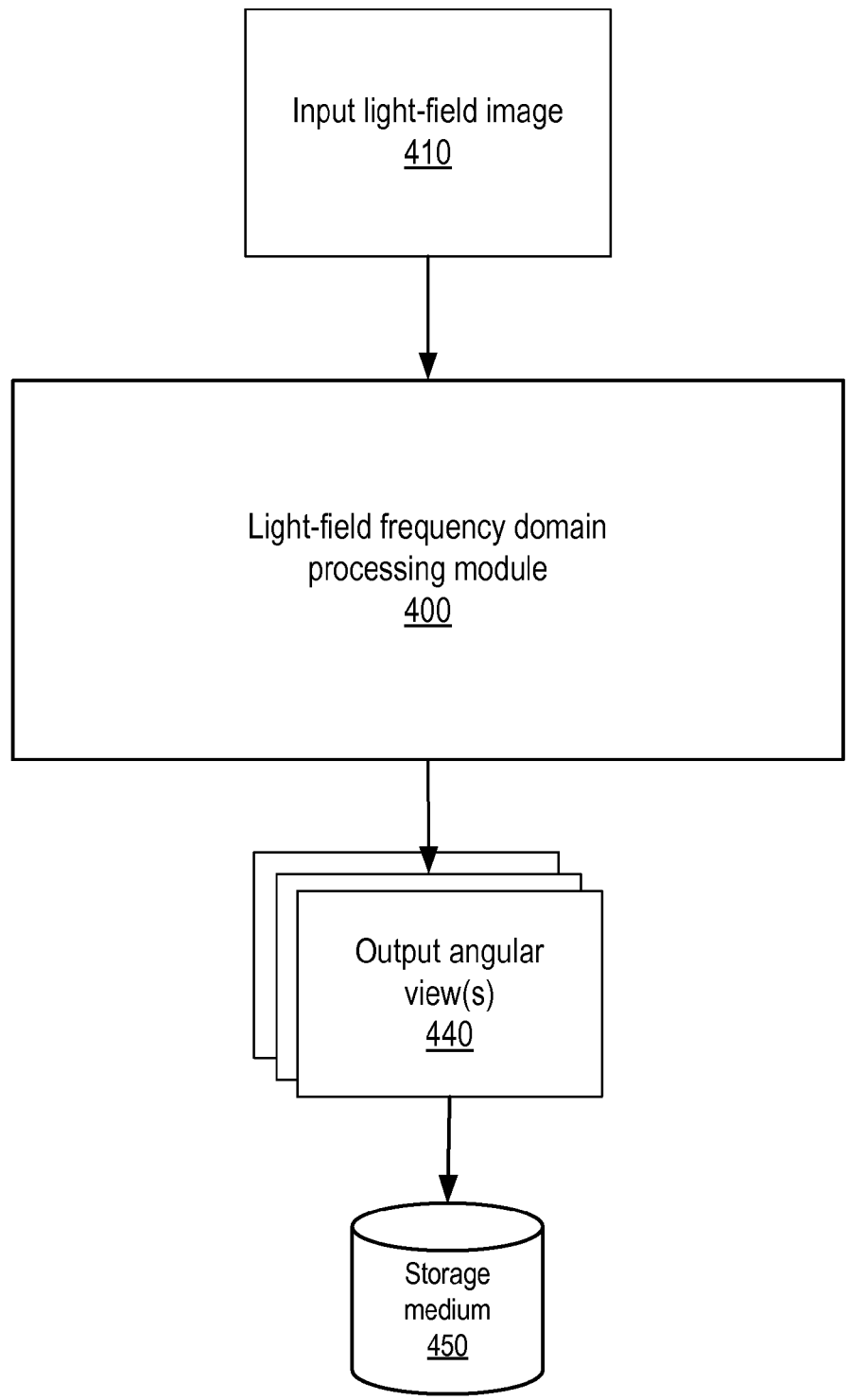
FIG. 10A illustrates a light-field frequency domain processing module, according to one embodiment.

FIG. 10A illustrates a light-field frequency domain processing module, according to one embodiment. Light-field frequency domain processing module 400 receives an input light-field image 410. Light-field frequency domain processing module 400 performs frequency domain processing on the input image 410 to generate one or more output angular views 440. During frequency domain processing, one or more of the above-described methods for removing artifacts may be applied. After frequency domain processing, the above-described method for cosmetic correction may be applied. Output angular views 440 may, for example, be stored to a storage medium 450, such as system memory, a disk drive, DVD, CD, etc.

Light-field frequency domain processing module 400 may provide a user interface that provides one or more textual and/or graphical user interface elements, modes or techniques via which a user may view or control various aspects of frequency domain processing including, but not limited to, implementations of the artifact removal methods as described herein. For example, the user interface may include user interface elements that allow a user to select input and output files, to initiate the cosmetic correction method, to select a base image $S_{base}$ for the cosmetic correction process, to specify a method to be used to detect the correct center of slices, and so on.

Figure 10B:
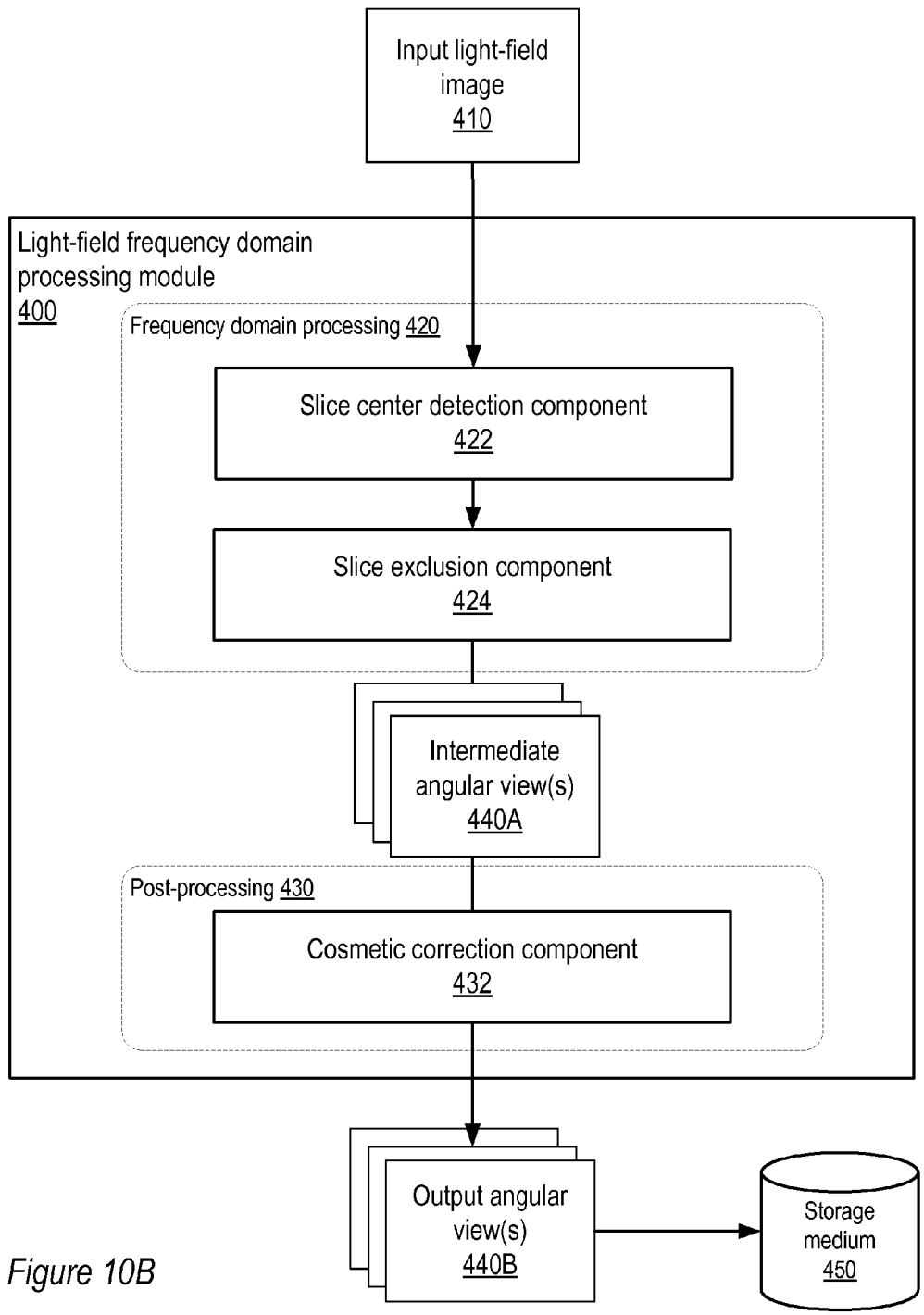
FIG. 10B illustrates a light-field frequency domain processing module in more detail, according to one embodiment.

FIG. 10B illustrates a light-field frequency domain processing module in more detail, according to one embodiment. This Figure shows light-field frequency domain processing module 400 as including frequency domain processing 420 and post-processing 430. During frequency domain processing 420, a slice center detection component 422 may implement one or both of the above-described methods for determining the correct center of the slices extracted from the 2-D Fourier image. If both methods are implemented, the user interface may provide a user interface mechanism whereby the user may select one, both, or even neither of the methods to be performed on a particular input image 410. Also during frequency domain processing 420, a slice exclusion component 424 may implement the slice exclusion method as described above. In the slice exclusion method, two or more slices with the lowest energy (e.g., slices nearest to the center slice) may be determined and excluded from further processing to generate output angular views 440. Note that, while FIG. 10B shows slice exclusion component 424 as logically after slice center detection component 422, slice center exclusion may be performed before or after slice center detection in different embodiments.

Frequency domain processing 420 may generate intermediate angular views 440A. During post-processing 430, a cosmetic correction component 432 may implement the cosmetic correction method described above on intermediate angular views 440A to generate output angular views 440B with artifacts removed. In one embodiment, cosmetic correction may be optional; thus, the user interface may provide one or more mechanisms whereby the user may select to perform or not perform cosmetic correction. In one embodiment, the user may be asked, via the user interface, to select and specify one of intermediate angular views 440A to be used as the base view ($S_{base}$) in the cosmetic correction process. In one embodiment, the user may be asked, via the user interface, to select and specify, or to exclude, particular ones of the other angular views to which the cosmetic correction process is to be applied. Note that the base view itself may not be modified in the cosmetic correction process.

Figure 11:
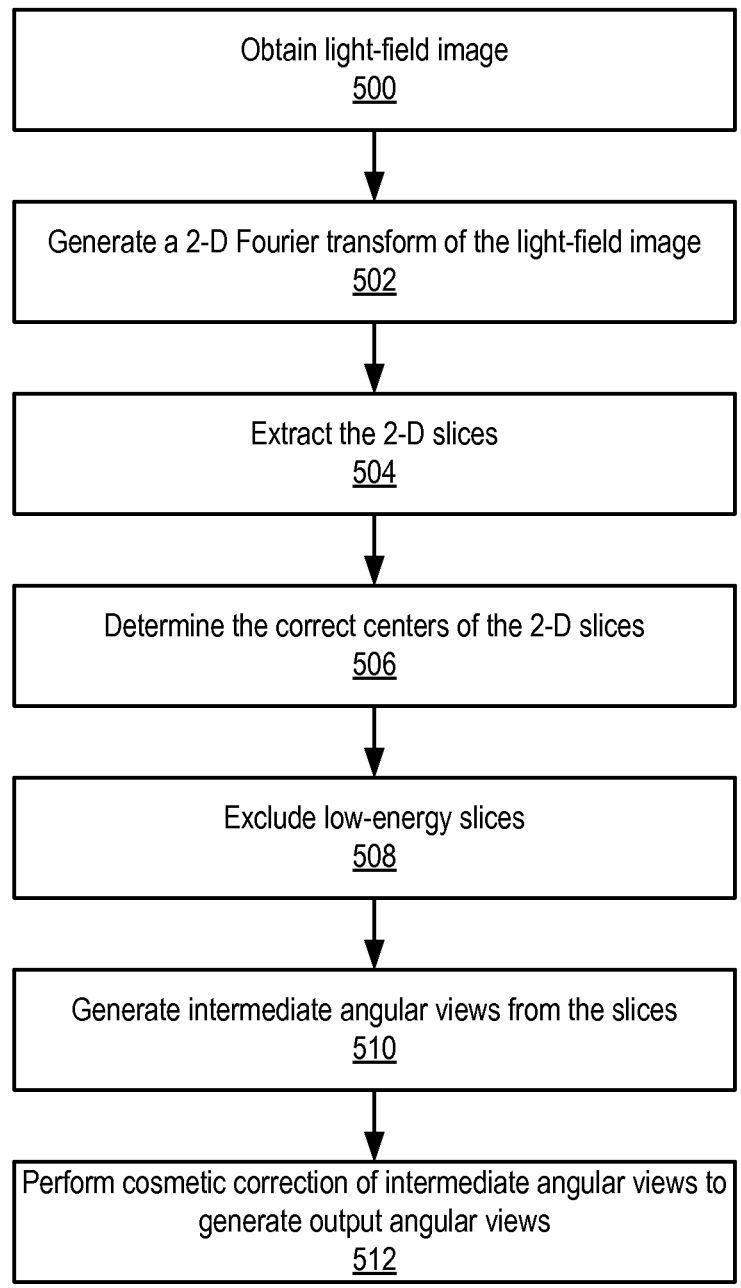
FIG. 11 is a flowchart of a method for removing artifacts in frequency domain processing of light-field images according to one embodiment.

FIG. 11 is a flowchart of a method for removing artifacts in frequency domain processing of light-field images according to one embodiment. The method may be implemented in a light-field frequency domain processing module, such as module 400 in FIGS. 10A and 10B. Various embodiments may implement some or all of the elements illustrated in FIG. 11. In some embodiments, various ones of the elements may be optionally performed or skipped according to user preference. In some embodiments, the elements may be performed in a different order than shown.

As indicated at 500, a light-field image may be obtained. As indicated at 502, a 2-D Fourier transform of the light-field image may be generated. As indicated at 504, multiple 2-D slices may be extracted from the 2-D Fourier transform.

Figure 12:
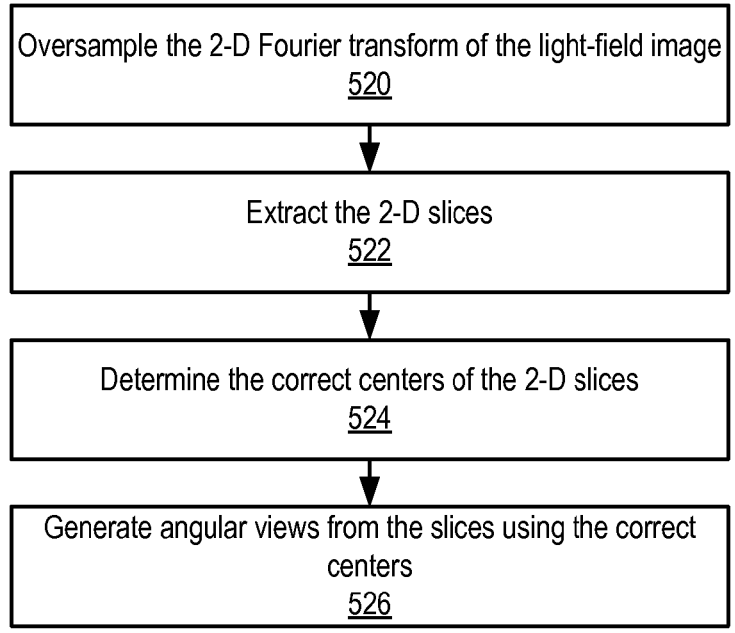
FIG. 12 is a flowchart of a method for removing artifacts in frequency domain processing of light-field images by finding the correct center of slices according to one embodiment.
Figure 15:
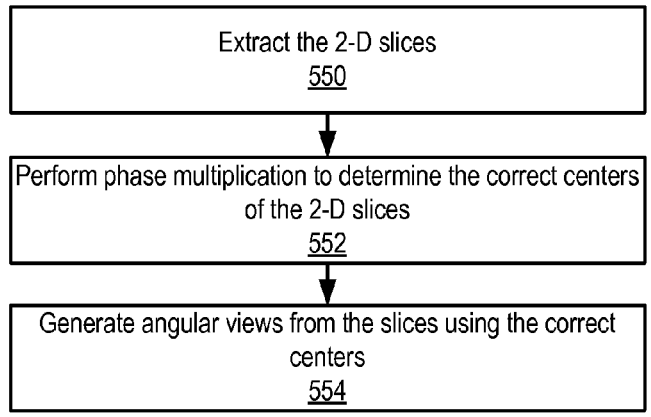
FIG. 15 is a high-level flowchart of a method for removing artifacts in frequency domain processing of light-field images by finding the correct center of slices using phase multiplication according to one embodiment.
Figure 16:
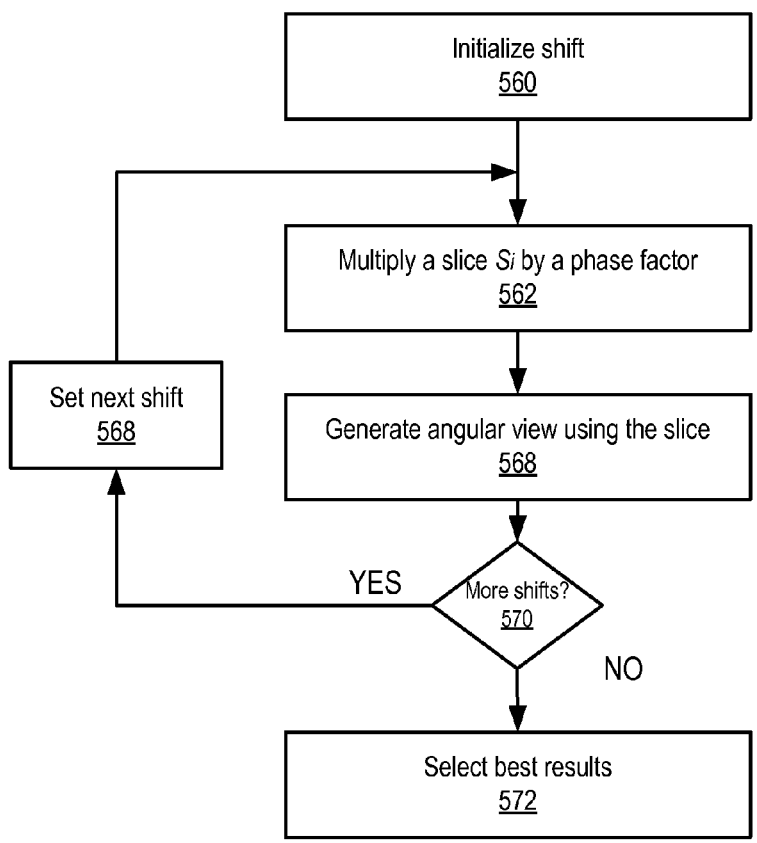
FIG. 16 is a flowchart of a method for finding the correct center of a slice in frequency domain processing of light-field images using phase multiplication according to one embodiment.

Incorrect centers of the slices may result in wave artifacts in the resultant angular views. In one embodiment, as indicated at 506, the correct centers of the 2-D slices may be determined. In one embodiment, an oversampling method may be implemented to determine the correct centers of the slices, as previously described and as illustrated in FIG. 12. In the oversampling method, the 2-D Fourier transform of the light-field image may be oversampled prior to slice extraction, e.g. prior to element 504. In one embodiment, oversampling is done by padding the acquired light-field image with the correct amount of zeros according to the oversampling rate and taking the Fourier transform of the padded image. In one embodiment, a phase multiplication method may be implemented to determine the correct centers of the slices after the slices are extracted, as previously described and as illustrated in FIGS. 15 and 16.

Figure 13:
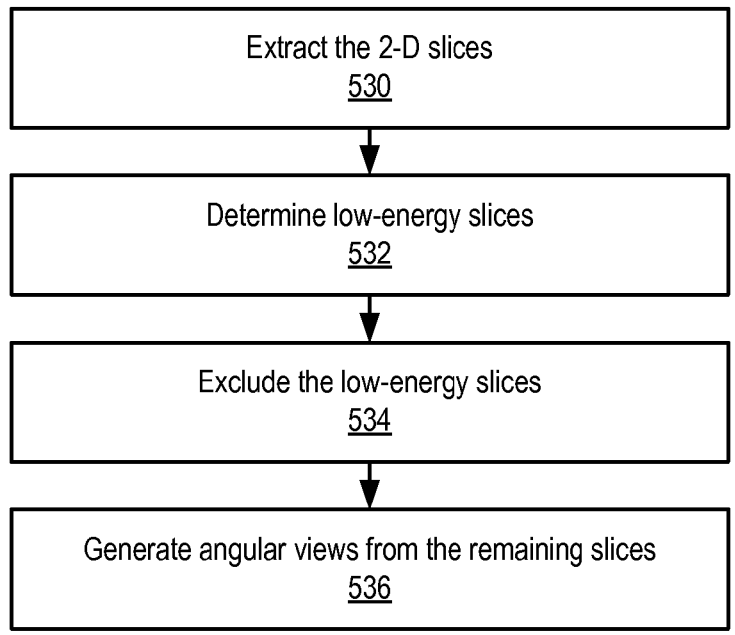
FIG. 13 is a flowchart of a method for removing artifacts in frequency domain processing of light-field images by excluding low-energy slices according to one embodiment.

As indicated at 508, two or more low-energy slices may be excluded from the demultiplexing process. The excluded slices may be the slices closest to the central slice or DC point, and are the slices containing the lowest energy. Excluding the low-energy slices may help to reduce or eliminate wave artifacts from the resultant angular views. FIG. 13 further illustrates a method of excluding low-energy slices.

As indicated at 510, intermediate angular views may be generated from the slices. In one embodiment, to generate an angular view, multiple ones of the slices may be stacked according to the determined centers of the slices, and an inverse 4-D Fourier transform may be performed on the stack to generate the angular view.

Figure 14:
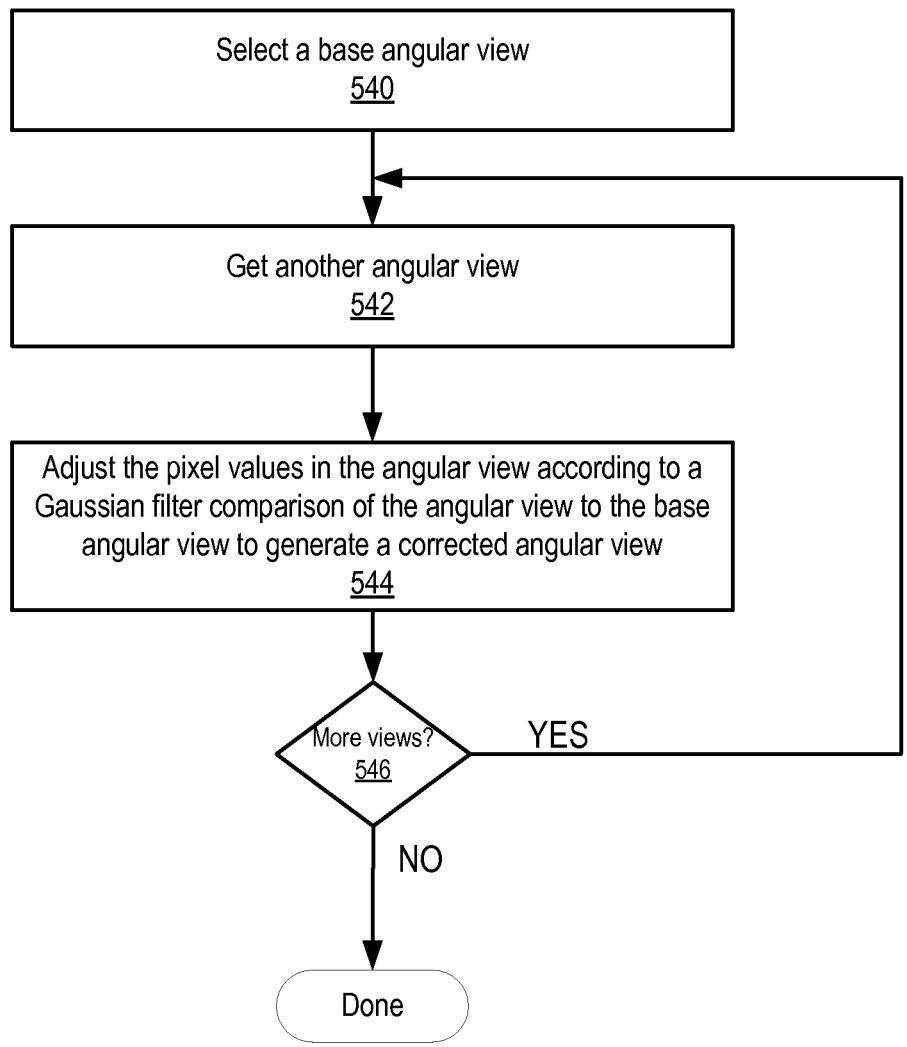
FIG. 14 is a flowchart of a method for performing cosmetic correction of intermediate angular views to generate corrected angular views according to one embodiment.

The intermediate angular views may still include some artifacts. As indicated at 512, a cosmetic correction of the intermediate angular views may be performed to generate corrected output angular views. In one embodiment, the user may be given the option to perform the cosmetic correction, if desired. FIG. 14 further illustrates a method of performing cosmetic correction.

FIG. 12 is a flowchart of a method for removing artifacts in frequency domain processing of light-field images by finding the correct center of slices according to one embodiment. As indicated at 520, the 2-D Fourier transform of a light-field image may be oversampled. As indicated at 522, 2-D slices may be extracted from the oversampled 2-D Fourier transform of the light-field image. As indicated at 524, the correct centers of the 2-D slices may be determined. Angular views may then be generated from the slices using the correct centers, as indicated at 526.

FIG. 13 is a flowchart of a method for removing artifacts in frequency domain processing of light-field images by excluding low-energy slices according to one embodiment. As indicated at 530, 2-D slices may be extracted from a 2-D Fourier transform of a light-field image. As indicated at 532, low-energy slices may be determined. In one embodiment, the low-energy slices are determined as the slices closest to the central slice or DC point. As indicated at 534, the low-energy slices are excluded from the demultiplexing process. Angular views may then be generated from the slices using the remaining, as indicated at 536.

FIG. 14 is a flowchart of a method for performing cosmetic correction of intermediate angular views to generate corrected angular views according to one embodiment. After frequency domain processing is performed to generate a set of angular views, a base angular view may be selected, as indicated at 540. In one embodiment, a user may select a visually preferred view as the base angular view. Cosmetic correction of the other angular views, or of at least a portion of the other angular views, may then be performed to adjust the other angular views according to the base angular view. As indicated at 542, another, or next, angular view may be obtained. As indicated at 544, the pixel values of the other angular view may be adjusted according to a Gaussian filter comparison of the angular view to the base angular view to generate a corrected angular view. Referring to the base view as $S_{base}$, the other angular view may be adjusted according to the following formula:

$$S_{i,new} = S_i + \text{Filter}(S_{base} - S_i)$$

Here, Filter( ) is a low-pass filter. For the sake of speed, this may be accomplished in one embodiment by:

$$\text{Filter}(x) = \text{gaussian}(\sigma) * \text{downsample}(x)$$

At 546, if there are more angular views to be corrected, the method returns to 542. Otherwise, the cosmetic correction process is done.

FIG. 15 is a high-level flowchart of a method for removing artifacts in frequency domain processing of light-field images by finding the correct center of slices using phase multiplication according to one embodiment. As indicated at 550, 2-D slices may be extracted from a 2-D Fourier transform of a light-field image. As indicated at 552, a phase multiplication method may be performed to determine the correct centers of the 2-D slices. Assume the center is determined to be (x, y); however, the actual location of the center is (x+δx, y+δy) where |δx, δy|<1. Instead of shifting the entire slice by (δx, δy), a slice $S_i$ may be multiplied by the phase factor:

$$e^{-i\left(\frac{2\pi\delta x}{N}x+\frac{2\pi\delta x}{M}y\right)}$$

After multiplying by the above phase factor, the inverse Fourier transform may be computed to get $S_{i,mid}$. $S_{i,mid}$ is then rearranged in 2-D, and another 2-D-inverse Fourier-transform is performed in order to obtain the angular views (e.g., views 208 of FIG. 2). As a result, the overall process may be represented by:

2-DIFT(arrangein2-D(correct phase(arragein2-D(R($\omega_x$, $\omega_\theta$))))).

Angular views may then be generated from the slices using the correct centers, as indicated at 554.

FIG. 16 is a flowchart of a method for finding the correct center of a slice in frequency domain processing of light-field images using phase multiplication according to one embodiment. 2-D slices may be extracted from a 2-D Fourier transform of a light-field image. The true center of the analog signal is assumed to be within one pixel of the initial center, generally determined as the pixel with the highest absolute value. Thus, one method to determine the true center is to iteratively perform phase multiplication at different intervals, or shifts, within one pixel of the center, generate results, and determine or select the best results. As indicated at 560, the shift is initialized. The shift is a value of less than one pixel, since the true center of the analog signal is assumed to be within one pixel of the initial center, generally determined as the pixel with the highest absolute value. As indicated at 562, a slice $S_i$ is multiplied by the phase factor:

$$e^{-i\left(\frac{2\pi\delta x}{N}x+\frac{2\pi\delta x}{M}y\right)}$$

After multiplying by the above phase factor, the inverse Fourier transform may be computed to get $S_{i,mid}$. $S_{i,mid}$ is then rearranged in 2-D, and another 2-D-inverse Fourier-transform is performed in order to obtain the angular view, as indicated at 568.

At 570, if there are more shifts to be tried, the next shift is set at 568, and the method returns to 562. Otherwise, all iterations have been performed, and a best or preferred result may be selected, as indicated at 572.

Exemplary System

Various components of embodiments of a method and apparatus for managing artifacts in frequency domain processing of light-field images may be executed on one or more computer systems, which may interact with various other devices. One such computer system is illustrated by FIG. 17. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a method and apparatus for managing artifacts in frequency domain processing of light-field images, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 17, memory 720 may include program instructions 725, configured to implement embodiments of a method and apparatus for managing artifacts in frequency domain processing of light-field images as described herein, and data storage 735, comprising various data accessible by program instructions 725. In one embodiment, program instructions 725 may include software elements of a method and apparatus for managing artifacts in frequency domain processing of light-field images as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a method and apparatus for managing artifacts in frequency domain processing of light-field images as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
extracting multiple slices from a Fourier transform of a light-field image;
determining a subset of the slices as low-energy slices;
generating multiple angular views from the multiple slices excluding the subset of the slices determined as the low-energy slices to prevent or lessen artifacts in the angular views, said generating each angular view comprising:
generating a stack including at least a portion of the multiple slices excluding the subset of the slices determined as the low-energy slices, the slices aligned in the stack in accordance with subpixel centers of the slices, each subpixel center corresponding to the DC point of the analog signal underlying the respective slice; and
performing an inverse Fourier transform on the stack to generate the angular view.

2. The method as recited in claim 1, wherein the low-energy slices are slices that are closest to a center slice, the center slice including the DC point of the Fourier transform of the light-field image.

3. The method as recited in claim 1, wherein the angular views each represent a scene captured in the light-field image at a particular focal plane.

4. The method as recited in claim 1, further comprising:
determining one of the angular views as a base view; and
adjusting pixel values in one or more of the other angular views according to pixel values in the base view to generate cosmetically corrected angular views from the one or more of the other angular views.

5. The method as recited in claim 1, wherein said generating the multiple angular views from the multiple slices excluding the subset of the slices determined as the low-energy slices is performed in accordance with the subpixel centers of the slices.

6. The method as recited in claim 5, further comprising:
generating the Fourier transform as an oversampled Fourier transform of the light-field image; and
determining the subpixel centers for the slices extracted from the oversampled Fourier transform, wherein each subpixel center corresponds to the DC point of the analog signal underlying the respective slice.

7. The method as recited in claim 5, further comprising iteratively applying phase multiplication to each slice to locate the DC point of the analog signal underlying the respective slice.

8. A system, comprising:
one or more processors configured to execute program instructions;
a memory comprising the program instructions stored as a light-field frequency domain processing module, the program instructions executable by the one or more processors to:
extract multiple slices from a Fourier transform of a light-field image;
determine a subset of the slices as low-energy slices;
generate multiple angular views from the multiple slices excluding the subset of the slices determined as the low-energy slices to prevent or lessen artifacts in the angular views, each of the multiple angular views generated by the one or more processors configured to:
generate a stack including at least a portion of the multiple slices excluding the subset of the slices determined as the low-energy slices, the slices aligned in the stack in accordance with subpixel centers of the slices, each subpixel center corresponding to the DC point of the analog signal underlying the respective slice; and
perform an inverse Fourier transform on the stack to generate the angular view.

9. The system as recited in claim 8, wherein the low-energy slices are slices that are closest to a center slice, the center slice including the DC point of the Fourier transform of the light-field image.

10. The system as recited in claim 8, wherein the angular views each represent a scene captured in the light-field image at a particular focal plane.

11. The system as recited in claim 8, wherein the program instructions are further executable by the one or more processors to:
determine one of the angular views as a base view; and
adjust pixel values in one or more of the other angular views according to pixel values in the base view to generate cosmetically corrected angular views from the one or more of the other angular views.

12. The system as recited in claim 8, wherein, to generate the multiple angular views from the multiple slices excluding the subset of the slices determined as the low-energy slices is performed in accordance with the subpixel centers of the slices.

13. One or more computer-readable storage devices comprising stored program instructions that are computer-executable to implement a light-field frequency domain processing module operable to:
generate a Fourier transform of a light-field image;
extract multiple slices from the Fourier transform of the light-field image;
determine a subset of the slices as low-energy slices;
generate multiple angular views from the multiple slices excluding the subset of the slices determined as the low-energy slices to prevent or lessen artifacts in the angular views, each of the multiple angular views generated by the light-field frequency domain processing module configured to:
generate a stack including at least a portion of the multiple slices excluding the subset of the slices determined as the low-energy slices, the slices aligned in the stack in accordance with subpixel centers of the slices, each subpixel center corresponding to the DC point of the analog signal underlying the respective slice; and
perform an inverse Fourier transform on the stack to generate the angular view.

14. The computer-readable storage devices as recited in claim 13, wherein the low-energy slices are slices that are closest to a center slice, the center slice including the DC point of the Fourier transform of the light-field image.

15. The computer-readable storage devices as recited in claim 13, wherein the angular views each represent a scene captured in the light-field image at a particular focal plane.

16. The computer-readable storage devices as recited in claim 13, wherein the light-field frequency domain processing module is further operable to:
determine one of the multiple angular views as a base view; and
adjust pixel values in one or more of the other angular views according to pixel values in the base view to generate cosmetically corrected angular views from the one or more of the other angular views.

17. The computer-readable storage devices as recited in claim 13, wherein, to generate the multiple angular views from the multiple slices excluding the subset of the slices determined as the low-energy slices, the light-field frequency domain processing module is further operable to generate the multiple angular views in accordance with subpixel centers of the slices.

18. The computer-readable storage devices as recited in claim 17, wherein the light-field frequency domain processing module is further operable to:
generate the Fourier transform as an oversampled Fourier transform of the light-field image; and
determine the subpixel centers for the slices extracted from the oversampled Fourier transform, each of the subpixel centers corresponding to the DC point of the analog signal underlying the respective slice.

19. The computer-readable storage devices as recited in claim 17, wherein the light-field frequency domain processing module is further operable to:
iteratively apply phase multiplication to each of the slices to locate the DC point of the analog signal underlying the respective slice, each of the subpixel centers corresponding to the DC point of the analog signal underlying the respective slice.

20. The system as recited in claim 12, wherein the program instructions are further executable to:
iteratively apply phase multiplication to each of the slices to locate the DC point of the analog signal underlying the respective slice, each of the subpixel centers corresponding to the DC point of the analog signal underlying the respective slice.

* * * * *